(12) United States Patent
Ota et al.

(10) Patent No.: US 8,503,167 B2
(45) Date of Patent: *Aug. 6, 2013

(54) SOLID ELECTROLYTIC CAPACITOR AND MANUFACTURING METHOD THEREOF

(75) Inventors: Taeko Ota, Takatsuki (JP); Gaku Harada, Kawanishi (JP); Takeshi Sano, Takatsuki (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 298 days.

This patent is subject to a terminal disclaimer.

(21) Appl. No.: 13/012,454

(22) Filed: Jan. 24, 2011

(65) Prior Publication Data

US 2011/0188173 A1    Aug. 4, 2011

(30) Foreign Application Priority Data

Jan. 27, 2010   (JP) .................................. 2010-015252
Jan. 27, 2010   (JP) .................................. 2010-015672

(51) Int. Cl.
*H01G 9/028*  (2006.01)

(52) U.S. Cl.
USPC .......................................... 361/525; 361/524

(58) Field of Classification Search
USPC ................... 361/523–524, 528–529
See application file for complete search history.

(56) References Cited

U.S. PATENT DOCUMENTS

| | | | |
|---|---|---|---|
| 5,729,428 A | 3/1998 | Sakata et al. | |
| 7,471,503 B2 * | 12/2008 | Bruner et al. | 361/525 |
| 2006/0082951 A1 | 4/2006 | Hirata et al. | |
| 2006/0084237 A1 | 4/2006 | Kobayashi | |
| 2010/0079928 A1 * | 4/2010 | Harada et al. | 361/523 |

FOREIGN PATENT DOCUMENTS

| | | |
|---|---|---|
| JP | H02-74021 A | 3/1990 |
| JP | H04-73924 A | 3/1992 |
| JP | H08-293436 A | 11/1996 |
| JP | H11-329900 A | 11/1999 |
| JP | 2006-140442 A | 6/2006 |
| JP | 2006-140443 A | 6/2006 |
| JP | 2009-032895 A | 2/2009 |

* cited by examiner

*Primary Examiner* — Eric Thomas
(74) *Attorney, Agent, or Firm* — Marvin A. Motsenbocker; Mots Law, PLLC

(57) ABSTRACT

The invention aims at providing a solid electrolytic capacitor having a high capacitance and a small equivalent series resistance (ESR) and a method for manufacturing the same. A solid electrolytic capacitor includes: an anode 1 made of a valve metal or an alloy thereof; a dielectric layer 2 provided on the surface of the anode 1; a first coupling agent layer 3 made of a coupling agent having a molecular structure in which at least two phosphonic acid groups are bonded via an alkyl group, the first coupling agent layer 3 being provided on the dielectric layer; a first conductive polymer layer 4 provided on the first coupling agent layer 3; and a cathode layer 11 provided on or above the first conductive polymer layer 4.

18 Claims, 10 Drawing Sheets

FIG. 1

SOLID ELECTROLYTIC CAPACITOR AND MANUFACTURING METHOD THEREOF

BACKGROUND OF THE INVENTION

1. Field of the Invention

This invention relates to solid electrolytic capacitors using a conductive polymer layer as a solid electrolyte and methods for manufacturing the same.

2. Description of Related Arts

With the recent trend towards smaller and lighter electronic devices, high-frequency capacitors of small size and high capacity are being desired. Among the capacitors proposed as such high-frequency capacitors are solid electrolytic capacitors in which the surface of an anode formed of a sintered body of a valve metal, such as tantalum, niobium, titanium or aluminum, is anodized to form a dielectric layer and a solid electrolyte layer is provided on the dielectric layer. In these solid electrolytic capacitors, a conductive polymer is used as the solid electrolyte layer to seek to reduce the equivalent series resistance (ESR).

However, the above solid electrolytic capacitors have a problem in that if the adherence between the dielectric layer formed of an inorganic material and the conductive polymer layer formed of an organic material decreases, the ESR increases.

To solve the above problem, Published Japanese Patent Applications Nos. H02-74021, H04-73924 and H08-293436 propose techniques in which after the formation of a dielectric layer on the surface of an anode, the surface of the dielectric layer is treated with a silane coupling agent and a conductive polymer layer is then formed thereon.

Published Japanese Patent Application No. H11-329900 proposes a technique of repeatedly performing a treatment with a silane coupling agent to the surface of a dielectric layer and a subsequent formation of a conductive polymer layer thereon.

Published Japanese Patent Application No. 2006-140443 proposes a technique in which a first conductive polymer layer is formed partially on a dielectric layer, a silane coupling agent-treated layer is then formed on part of the dielectric layer on which the first conductive polymer is not formed, and a second conductive polymer layer is formed on both the first conductive polymer layer and the silane coupling agent-treated layer.

The silane coupling agents used in the techniques disclosed in Published Japanese Patent Applications Nos. H02-74021, H04-73924, H08-293436, H11-329900 and 2006-140443 have a molecular structure containing a coupling group capable of being bonded to the dielectric layer made of an inorganic material and a hydrophobic group of good wettability with the conductive polymer made of an organic material. According to these techniques, the adherence between the silane coupling agent serving as a surface treatment and the conductive polymer serving as a solid electrolyte is improved but is not satisfactory.

A solution to the above is proposed in Published Japanese Patent Application No. 2006-140442, wherein the improvement in adherence is implemented by using a surface treatment having a molecular structure in which a group serving as a dopant for conductive polymer is located at a distal end of a hydrophobic group. However, this solution has a problem in that the process of reacting the surface treatment with the dielectric layer is complicated.

Another solution is proposed in Published Japanese Patent Application No. 2009-32895, wherein the improvement in adherence is implemented by using a surface treatment having a molecular structure in which a structure of a conductive polymer monomer is bonded to a distal end of a hydrophobic group.

However, even with the use of the above surface treatments, the reduction in ESR is not yet satisfactory.

SUMMARY OF THE INVENTION

An object of the present invention is to provide a solid electrolytic capacitor having a high capacitance and a small ESR and a method for manufacturing the same.

A solid electrolytic capacitor according to the present invention includes: an anode made of a valve metal or an alloy thereof; a dielectric layer provided on the surface of the anode; a first coupling agent layer made of a coupling agent containing phosphonic acid groups, the first coupling agent layer being provided on the dielectric layer; a first conductive polymer layer provided on the first coupling agent layer; and a cathode layer provided on or above the first conductive polymer layer.

A solid electrolytic capacitor according to a first aspect of the invention includes: an anode made of a valve metal or an alloy thereof; a dielectric layer provided on the surface of the anode; a first coupling agent layer made of a coupling agent having a molecular structure in which at least two phosphonic acid groups are bonded via an alkyl group, the first coupling agent layer being provided on the dielectric layer; a first conductive polymer layer provided on the first coupling agent layer; and a cathode layer provided on or above the first conductive polymer layer.

A solid electrolytic capacitor according to a second aspect of the invention relates to the solid electrolytic capacitor according to the first aspect of the invention and further includes: a second coupling agent layer made of the coupling agent and provided on the first conductive polymer layer; and a second conductive polymer layer provided on the second coupling agent layer, wherein the cathode layer is provided on or above the second conductive polymer layer.

A solid electrolytic capacitor according to a third aspect of the invention includes: an anode made of a valve metal or an alloy thereof; a dielectric layer provided on the surface of the anode; a first conductive polymer layer provided on the dielectric layer; a coupling agent layer made of a coupling agent having a molecular structure in which at least two phosphonic acid groups are bonded via an alkyl group, the coupling agent layer being provided on the first conductive polymer layer; a second conductive polymer layer provided on the coupling agent layer; and a cathode layer provided on or above the second conductive polymer layer.

The coupling agent used in the above aspects of the invention is a coupling agent having a molecular structure in which at least two phosphonic acid groups are bonded via an alkyl group. The coupling agent may be a coupling agent represented by the following general formula:

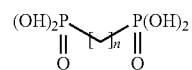

wherein n represents an integer of 1 to 18 which is the number of carbon atoms.

A manufacturing method according to a fourth aspect of the invention is a method which can manufacture the solid electrolytic capacitor according to the first aspect of the invention and includes the steps of: forming the anode; forming the dielectric layer on the surface of the anode; forming the first coupling agent layer on the dielectric layer; forming the first conductive polymer layer on the first coupling agent layer; and forming the cathode layer on or above the first conductive polymer layer.

A manufacturing method according to a fifth aspect the invention is a method which can manufacture the solid electrolytic capacitor according to the second aspect of the invention. The method relates to the manufacturing method according to the fourth aspect of the invention and further includes the steps of: forming the second coupling agent layer on the first conductive polymer layer; forming the second conductive polymer layer on the second coupling agent layer; and forming the cathode layer on or above the second conductive polymer layer.

A manufacturing method according to a sixth aspect of the invention is a method which can manufacture the solid electrolytic capacitor according to the third aspect of the invention and includes the steps of: forming the anode; forming the dielectric layer on the surface of the anode; forming the first conductive polymer layer on the dielectric layer; forming the coupling agent layer on the first conductive polymer layer; forming the second conductive polymer layer on the coupling agent layer; and forming the cathode layer on or above the second conductive polymer layer.

A solid electrolytic capacitor according to a seventh aspect of the invention includes: an anode made of a valve metal or an alloy thereof; a dielectric layer provided on the surface of the anode; a first coupling agent layer made of a coupling agent having a molecular structure in which a phosphonic acid group and a conductive polymer monomer are bonded via an alkyl group, the first coupling agent layer being provided on the dielectric layer; a first conductive polymer layer provided on the first coupling agent layer; and a cathode layer provided on or above the first conductive polymer layer.

A solid electrolytic capacitor according to an eighth aspect of the invention relates to a solid electrolytic capacitor according to the seventh aspect of the invention, and further includes: a second coupling agent layer made of the coupling agent and provided on the first conductive polymer layer; and a second conductive polymer layer provided on the second coupling agent layer, wherein the cathode layer is provided on or above the second conductive polymer layer.

A solid electrolytic capacitor according to a ninth aspect of the invention includes: an anode made of a valve metal or an alloy thereof; a dielectric layer provided on the surface of the anode; a first conductive polymer layer provided on the dielectric layer; a coupling agent layer made of a coupling agent having a molecular structure in which a phosphonic acid group and a conductive polymer monomer are bonded via an alkyl group, the coupling agent layer being provided on the first conductive polymer layer; a second conductive polymer layer provided on the coupling agent layer; and a cathode layer provided on or above the second conductive polymer layer.

The coupling agent used in the seventh to ninth aspects of the invention is a coupling agent having a molecular structure in which a phosphonic acid group and a conductive polymer monomer are bonded via an alkyl group. The coupling agent may be a coupling agent represented by the following general formula:

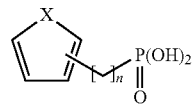

wherein n represents an integer of 1 to 18 which is the number of carbon atoms, and x represents nitrogen or sulfur.

In the coupling agent, the alkyl group is preferably bonded to the conductive polymer monomer at a position other than the 1-position of a heterocycle forming the conductive polymer monomer.

A manufacturing method according to a tenth aspect of the invention is a method which can manufacture the solid electrolytic capacitor according to the seventh aspect of the invention and includes the steps of: forming the anode; forming the dielectric layer on the surface of the anode; forming the first coupling agent layer on the dielectric layer; forming the first conductive polymer layer on the first coupling agent layer; and forming the cathode layer on or above the first conductive polymer layer.

A manufacturing method according to an eleventh aspect of the invention is a method which can manufacture the solid electrolytic capacitor according to the eighth aspect of the invention. The method relates to the manufacturing method according to the tenth aspect of the invention and further includes the steps of: forming the second coupling agent layer on the first conductive polymer layer; forming the second conductive polymer layer on the second coupling agent layer; and forming the cathode layer on or above the second conductive polymer layer.

A manufacturing method according to a twelfth aspect of the invention is a method which can manufacture the solid electrolytic capacitor according to the ninth aspect of the invention and includes the steps of: forming the anode; forming the dielectric layer on the surface of the anode; forming the first conductive polymer layer on the dielectric layer; forming the coupling agent layer on the first conductive polymer layer; forming the second conductive polymer layer on the coupling agent layer; and forming the cathode layer on or above the second conductive polymer layer.

According to the second and third aspects of the invention, a solid electrolytic capacitor can be provided which has a high capacitance and a small ESR.

According to the fourth, fifth and sixth aspects of the invention, a high capacitance, low ESR solid electrolytic capacitor can be efficiently manufactured.

According to the seventh, eighth and ninth aspects of the invention, a solid electrolytic capacitor can be provided which has a high capacitance and a small ESR.

According to the tenth, eleventh and twelfth aspects of the invention, a high capacitance, low ESR solid electrolytic capacitor can be efficiently manufactured.

DETAILED DESCRIPTION OF PREFERRED EMBODIMENTS

Figure 1:
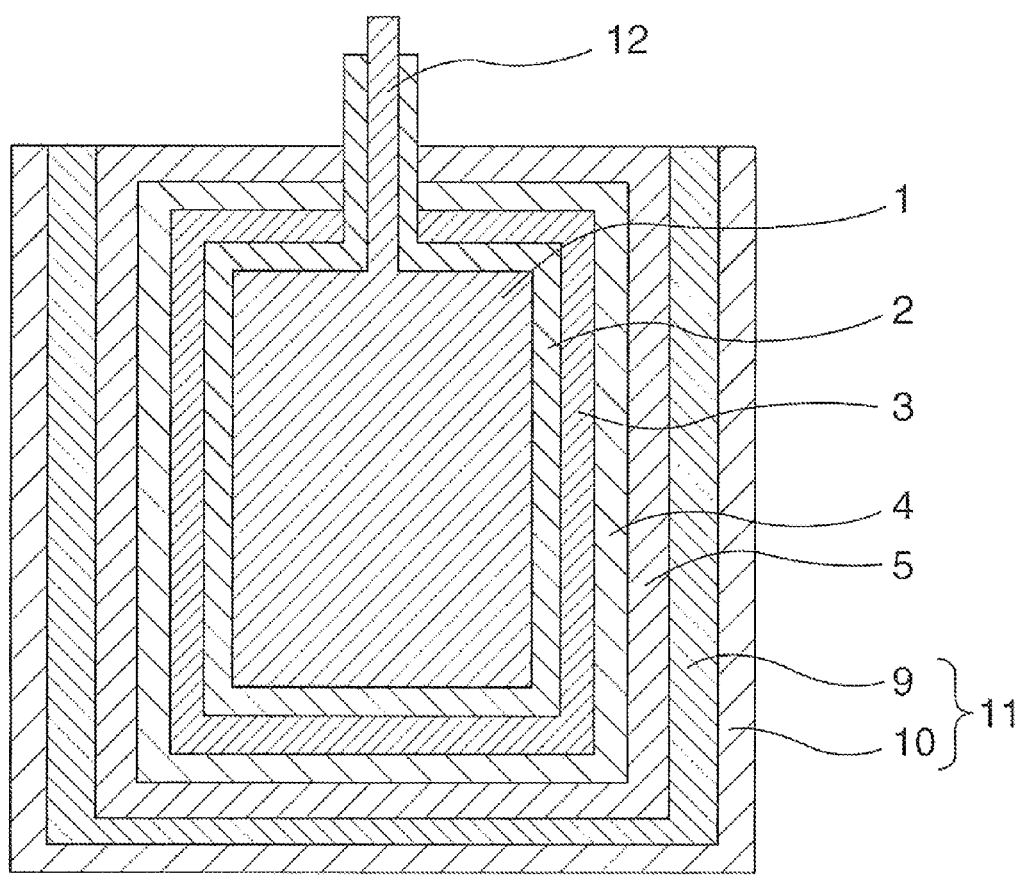
FIG. 1 is a schematic cross-sectional view of a solid electrolytic capacitor representing embodiments according to the first and seventh aspects of the invention.

The present invention will be described in more detail below.

In the present invention, a first coupling agent layer is provided on a dielectric layer, a first conductive polymer layer is provided on the first coupling agent layer, and a cathode layer is provided on or above the first conductive polymer layer.

In the present invention, the coupling agent layer is formed using a coupling agent containing a phosphonic acid group. A phosphonic acid group can directly react with the oxide film of the dielectric layer. Therefore, a phosphonic acid group or one of phosphonic acid groups in the molecular structure of the coupling agent can be used for the reaction with the dielectric layer. Thus, as compared with the use of a silane coupling agent, the amount of agent reacted with the dielectric layer can be increased. The increase in the amount of agent reacted increases the coverage of the dielectric layer with the coupling agent layer.

<First Aspect of the Invention>

In the first aspect of the invention, the coupling agent layer is formed using a coupling agent having a molecular structure in which at least two phosphonic acid groups are bonded via an alkyl group. Since phosphonic acid groups can directly react with the oxide film of the dielectric layer as described above, one of the at least two phosphonic acid groups in the molecular structure of the coupling agent can be used for the reaction with the dielectric layer. Thus, as compared with the use of a silane coupling agent, the amount of agent reacted with the dielectric layer can be increased. The increase in the amount of agent reacted increases the coverage of the dielectric layer with the coupling agent layer.

Furthermore, a large number of phosphonic acid groups are present on the surface of the coupling agent layer. Therefore, the coupling agent layer can be hydrophilized. The hydrophilization improves the impregnation of the porous body anode with an oxidizing agent or conductive polymer monomer which is used to form a conductive polymer layer, and increases the coverage.

Moreover, a large number of phosphonic acid groups not bonded to the dielectric layer can be present on the surface of the coupling agent layer. In forming a conductive polymer layer on the coupling agent layer, such a phosphonic acid group interacts with a conductive polymer in the conductive polymer layer. For example, the phosphonic acid group forms a bond with a N atom in a pyrrole ring or a S atom in a thiophene ring. The formation of such bonds allows the phosphonic acid groups to function as a dopant for the conductive polymer layer. Therefore, the coupling agent layer and the conductive polymer layer are bonded, whereby the layer stack from the dielectric layer to the conductive polymer layer is formed into an integral structure integrated via the coupling agent layer. Hence, the adherence between the dielectric layer and the conductive polymer layer can be made firmer.

In addition, since as described above the phosphonic acid groups in the coupling agent layer function as a dopant for the conductive polymer, the electrical conductivity of the conductive polymer layer can be enhanced, thereby reducing the ESR.

The increased coverage of the dielectric layer with the conductive polymer layer increases the electrode area of the solid electrolytic capacitor. Thus, the capacitance of the solid electrolytic capacitor can be increased.

Furthermore, the coupling agent layer uniformly covers the surface of the dielectric layer, whereby the alkyl sites in the coupling agent layer function as an insulating film between the dielectric layer and the first conductive polymer layer. This reduces the leakage current due to a defect in the dielectric layer.

Moreover, since the dielectric layer and the first coupling agent layer can be bonded together and the first coupling agent layer and the first conductive polymer layer can be bonded together, the interface adherence can be improved to reduce the contact resistance and thereby reduce the ESR.

The reaction of a silane coupling agent is as follows: First, the silane coupling agent is hydrolyzed by water to silanol (Si—OR→Si—OH) and partially condensed into an oligomer. Subsequently, silanol adsorbs onto hydroxy groups on the surface of an inorganic material. When the inorganic material is heated, a dehydration condensation reaction is caused to form a strong chemical bond between the silane coupling agent and the inorganic material. In this case, since the hydrolysis reaction is initiated in the presence of water, the treatment must be conducted in an atmosphere of water-free air or solvent, or alternatively a solution of silane coupling agent must be used immediately after it is prepared. Unlike the silane coupling agent, the coupling agent according to this aspect of the invention containing phosphonic acid groups requires no hydrolysis reaction since it has a chemical structure originally containing hydroxy groups (P—OH). Therefore, the coupling agent is not affected by water in air or solvent. Accordingly, the coupling agent containing phosphonic acid groups has excellent storage stability, whereby a solid electrolytic capacitor having a stable quality can be manufactured.

In the first aspect of the invention, a first coupling agent layer is formed on a dielectric layer by using a coupling agent having a molecular structure in which at least two phosphonic acid groups are bonded via an alkyl group, and a first conductive polymer layer is formed on the first coupling agent layer. Therefore, the coverage of the dielectric layer with the first coupling agent layer can be increased. In addition, since the dielectric layer and the first conductive polymer layer are bonded via the coupling agent layer, the adherence between the dielectric layer and the first conductive polymer layer can be increased. Hence, a solid electrolytic capacitor can be provided which has a high capacitance and a small. ESR.

In the first aspect of the invention, a cathode layer is provided on or above the first conductive polymer layer. Therefore, the cathode layer may be provided directly on the first conductive polymer layer or may be provided above the first conductive polymer layer with another layer interposed therebetween. Specifically, for example, a second conductive polymer layer may be provided on the first conductive polymer layer, and the cathode layer may be provided on the second conductive polymer layer.

<Second Aspect of the Invention>

The second aspect of the invention relates to the solid electrolytic capacitor according to the first aspect of the invention, and the solid electrolytic capacitor further includes: a second coupling agent layer provided on the first conductive polymer layer; and a second conductive polymer layer provided on the second coupling agent layer, wherein the cathode layer is provided on or above the second conductive polymer layer.

Therefore, according to the second aspect of the invention, not only the effects in the first aspect of the invention but also the following effects can be performed.

In the second aspect of the invention, since the first conductive polymer layer, the second coupling agent layer and the second conductive polymer layer are sequentially formed, the electrical conductivity of the first conductive polymer layer can be increased by the second coupling agent layer. Furthermore, the adherence between the first and second conductive polymer layers can be further increased via the second coupling agent layer. Therefore, the ESR can be further reduced.

Moreover, even if a defect is produced in the dielectric layer owing to polymerization reaction or process during the formation of the first conductive polymer layer, the coupling agent layer is formed on the defect, so that the leakage current can be small.

In the second aspect of the invention, a third conductive polymer layer may be formed on the second conductive polymer layer and the cathode layer may be formed on or above the third conductive polymer layer. In this case, a third coupling agent layer may be provided between the second and third conductive polymer layers. Part of the third coupling agent layer is also introduced as a dopant into the second conductive polymer layer. Therefore, the electrical conductivity of the second conductive polymer layer can be increased, and the adherence between the second and third conductive polymer layers can be increased via the third coupling agent layer. Hence, the ESR can be further reduced.

<Third Aspect of the Invention>

In the third aspect of the invention, a first conductive polymer layer is provided on a dielectric layer, a coupling agent layer is provided on the first conductive polymer layer, a second conductive polymer layer is provided on the coupling agent layer, and a cathode layer is provided on or above the second conductive polymer.

Therefore, like the second aspect of the invention, since the first conductive polymer layer, the coupling agent layer and the second conductive polymer layer are sequentially formed, the electrical conductivity of the first conductive polymer layer can be increased by the coupling agent layer. Furthermore, the adherence between the first and second conductive polymer layers can be further increased through the mediation of the coupling agent layer. Hence, the ESR can be further reduced.

Moreover, even if a defect is produced in the dielectric layer owing to polymerization reaction or process during the formation of the first conductive polymer layer, the coupling agent layer is formed on the defect, so that the leakage current can be small.

Also in the third aspect of the invention, like the second aspect of the invention, a third conductive polymer layer may be formed on the second conductive polymer layer and the cathode layer may be formed on or above the third conductive polymer layer. In this case, a second coupling agent layer may be provided between the second and third conductive polymer layers. Part of the second coupling agent layer is also introduced as a dopant into the second conductive polymer layer. Therefore, the electrical conductivity of the second conductive polymer layer can be increased, and the adherence between the second and third conductive polymer layers can be increased via the second coupling agent layer. Hence, the ESR can be further reduced.

<Seventh Aspect of the Invention>

In the seventh aspect of the invention, a first coupling agent layer is provided on a dielectric layer, a first conductive polymer layer is provided on the first coupling agent layer, and a cathode layer is provided on or above the first conductive polymer layer.

In the seventh aspect of the invention, the coupling agent layer is formed using a coupling agent having a molecular structure in which a phosphonic acid group and a conductive polymer monomer are bonded via an alkyl group. Coupling groups having a phosphonic acid group directly react with the oxide film of the dielectric layer. Therefore, as compared with the use of a silane coupling agent, the amount of agent reacted with the dielectric layer can be increased. The increase in the amount of agent reacted increases the coverage of the dielectric layer with the coupling agent layer. Thus, a large number of conductive polymer monomers bonded to the coupling agent can be present on the surface of the coupling agent layer, which increases the number of sites of reaction of the conductive polymer monomers with conductive polymer monomers used in forming the first conductive polymer layer serving as a solid electrolyte. Hence, the coverage with the first conductive polymer layer can be increased.

Furthermore, by the reaction between conductive polymer monomers bonded to the coupling agent and conductive polymer monomers used in forming the first conductive polymer layer, the layer stack from the dielectric layer to the first conductive polymer layer can be formed into an integral structure integrated by covalent bonding via the coupling agent layer. Therefore, the adherence between the dielectric layer and the first conductive polymer layer can be made firmer. This increases the electrode area of the solid electrolytic capacitor and thereby increases the capacitance thereof.

Furthermore, the coupling agent layer uniformly covers the surface of the dielectric layer, whereby the alkyl sites in the coupling agent layer function as an insulating film between the dielectric layer and the first conductive polymer layer. This reduces the leakage current due to a defect in the dielectric layer.

Moreover, since the dielectric layer and the first coupling agent layer can be covalently bonded and the first coupling agent layer and the first conductive polymer layer can be covalently bonded, the interface adherence is improved to reduce the contact resistance and thereby reduce the ESR.

The reaction of a silane coupling agent is as follows: First, the silane coupling agent is hydrolyzed by water to silanol (Si—OR→Si—OH) and partially condensed into an oligomer. Subsequently, silanol adsorbs onto hydroxy groups on the surface of an inorganic material. When the inorganic material is heated, a dehydration condensation reaction is caused to form a strong chemical bond between the silane coupling agent and the inorganic material. In this case, since the hydrolysis reaction is initiated in the presence of water, the treatment must be conducted in an atmosphere of water-free air or solvent, or alternatively a solution of silane coupling agent must be used immediately after it is prepared. Unlike the silane coupling agent, the coupling agent according to this aspect of the invention containing phosphonic acid groups requires no hydrolysis reaction since it has a chemical structure originally containing hydroxy groups (P—OH). Therefore, the coupling agent is not affected by water in air or solvent. Accordingly, the coupling agent containing phosphonic acid groups has excellent storage stability, whereby a solid electrolytic capacitor having a stable quality can be manufactured.

In addition, phosphonic acid groups in the coupling agent in this aspect of the invention can be introduced into the conductive polymer compound in the conductive polymer layer and thereby allowed to function as a dopant for the conductive polymer layer. Therefore, the electrical conductivity of the conductive polymer layer can be enhanced and, also in this respect, the ESR can be reduced.

In the seventh aspect of the invention, a first coupling agent layer is formed on a dielectric layer by using a coupling agent having a molecular structure in which a phosphonic acid group and a conductive polymer monomer are bonded via an alkyl group, and a first conductive polymer layer is formed on the first coupling agent layer. Therefore, the coverage of the dielectric layer with the first coupling agent layer can be increased. In addition, since the dielectric layer and the first conductive polymer layer are covalently bonded via the coupling agent layer, the adherence between the dielectric layer and the first conductive polymer layer can be increased. Hence, a solid electrolytic capacitor can be provided which has a high capacitance and a small ESR.

In the seventh aspect of the invention, a cathode layer is provided on or above the first conductive polymer layer. Therefore, the cathode layer may be provided directly on the first conductive polymer layer or may be provided above the first conductive polymer layer with another layer interposed therebetween. Specifically, for example, a second conductive polymer layer may be provided on the first conductive polymer layer, and a cathode layer may be provided on the second conductive polymer layer.

<Eighth Aspect of the Invention>

The eighth aspect of the invention relates to the solid electrolytic capacitor according to the seventh aspect of the invention, and the solid electrolytic capacitor further includes: a second coupling agent layer provided on the first conductive polymer layer; and a second conductive polymer layer provided on the second coupling agent layer, wherein the cathode layer is provided on or above the second conductive polymer layer.

Therefore, according to the eighth aspect of the invention, not only the effects in the seventh aspect of the invention but also the following effects can be performed.

In the eighth aspect of the invention, since the first conductive polymer layer, the second coupling agent layer and the second conductive polymer layer are sequentially formed, the electrical conductivity of the first conductive polymer layer can be increased by the second coupling agent layer. Furthermore, the adherence between the first and second conductive polymer layers can be further increased via the second coupling agent layer. Therefore, the ESR can be further reduced.

Moreover, even if a defect is produced in the dielectric layer owing to polymerization reaction or process during the formation of the first conductive polymer layer, the coupling agent layer is formed on the defect, so that the leakage current can be small.

In the eighth aspect of the invention, a third conductive polymer layer may be formed on the second conductive polymer layer and the cathode layer may be formed on or above the third conductive polymer layer. In this case, a third coupling agent layer may be provided between the second and third conductive polymer layers. Part of the third coupling agent layer is also introduced as a dopant into the second conductive polymer layer. Therefore, the electrical conductivity of the second conductive polymer layer can be increased, and the adherence between the second and third conductive polymer layers can be increased via the third coupling agent layer. Hence, the ESR can be further reduced.

<Ninth Aspect of the Invention>

In the ninth aspect of the invention, a first conductive polymer layer is provided on a dielectric layer, a coupling agent layer is provided on the first conductive polymer layer, a second conductive polymer layer is provided on the coupling agent layer, and a cathode layer is provided on or above the second conductive polymer.

Therefore, like the eighth aspect of the invention, since the first conductive polymer layer, the coupling agent layer and the second conductive polymer layer are sequentially formed, the electrical conductivity of the first conductive polymer layer can be increased by the coupling agent layer. Furthermore, the adherence between the first and second conductive polymer layers can be further increased through the mediation of the coupling agent layer. Therefore, the ESR can be further reduced.

Moreover, even if a defect is produced in the dielectric layer owing to polymerization reaction or process during the formation of the first conductive polymer layer, the coupling agent layer is formed on the defect, so that the leakage current can be small.

Also in the ninth aspect of the invention, like the eighth aspect of the invention, a third conductive polymer layer may be formed on the second conductive polymer layer and the cathode layer may be formed on or above the third conductive polymer layer. In this case, a second coupling agent layer may be provided between the second and third conductive polymer layers. Part of the second coupling agent layer is also introduced as a dopant into the second conductive polymer layer. Therefore, the electrical conductivity of the second conductive polymer layer can be increased, and the adherence between the second and third conductive polymer layers can be increased via the second coupling agent layer. Hence, the ESR can be further reduced.

<Coupling Agent>

The coupling agent used in the first to sixth aspects of the invention is a coupling agent having a molecular structure in which at least two phosphonic acid groups are bonded via an alkyl group. An example of the coupling agent is a coupling agent whose molecule has phosphonic acid groups located at both distal ends. Specifically, for example, the coupling agent is represented by the general formula as described previously.

Specific examples of the coupling agent represented by the general formula include methylenediphosphonic acid, 1,8-octanediphosphonic acid and (12-phosphonododecyl)phosphonic acid.

When one of the two phosphonic acid groups in the molecular structure of the coupling agent reacts with the dielectric layer, the other phosphonic acid group is present as a dopant on the coupling agent layer. With the use of the coupling agent in the above aspects of the invention, a dopant can be easily coupled to the surface of the dielectric layer in a single step reaction. In the case of conventional materials, after the coupling of the coupling agent to the dielectric layer, a further reaction is required to give the coupling agent a dopant function. Unlike the conventional case, according to the above aspects of the invention, coupling can be implemented in a single reaction.

The coupling agent used in the seventh to twelfth aspects of the invention is a coupling agent having a molecular structure in which a phosphonic acid group and a conductive polymer monomer are bonded via an alkyl group. Specifically, an example of the coupling agent is represented by the general formula as described previously.

As described above, the preferred coupling agent used is a coupling agent having a molecular structure in which an alkyl group is bonded to a conductive polymer monomer at a position other than the 1-position of a heterocycle forming the conductive polymer monomer. If the alkyl group is bonded to the conductive polymer monomer at the 1-position of the heterocycle forming the conductive polymer monomer, a dopant becomes less likely to be doped into conductive polymer after polymerization. On the other hand, if the alkyl group is bonded to the conductive polymer monomer at a position other than the 1-position of the heterocycle forming the conductive polymer monomer, the doping can be easily performed. This improves the electrical conductivity of the conductive polymer layer and further reduces the ESR.

An example of a coupling agent having a molecular structure in which an alkyl group is substituted at the 2- or 5-position of a heterocycle forming a conductive polymer monomer is represented by the following general formula:

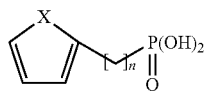

wherein n represents an integer of 1 to 18 which is the number of carbon atoms, and x represents nitrogen or sulfur.

With the use of a coupling agent having a molecular structure in which an alkyl group is attached to the 2- or 5-position of a heterocycle forming a conductive polymer monomer, when a conductive polymer of a conductive polymer layer is formed by polymerization, conductive polymer monomer units for the conductive polymer layer are polymerized mainly by their bonding between the 2- and 5-positions. Therefore, with the use of a coupling agent having a molecular structure in which an alkyl group is attached to the 2- or 5-position of a heterocycle, the direction of growth of polymer chains in the conductive polymer layer can be oriented vertically to the dielectric layer. This further enhances the adherence by covalent bonding between the conductive polymer monomer in the coupling agent layer and the polymer in the conductive polymer layer formed on the coupling agent layer and thereby further reduces the ESR. Furthermore, since the polymer chains are vertically grown, electrons can flow towards the cathode while traveling through the polymer chains, whereby the ESR can be further reduced.

An example of a coupling agent in which the heterocycle forming the conductive polymer monomer is a thiophene ring and an alkyl group is bonded to the 2- or 5-position of the thiophene ring is represented by the following general formula.

Note that in all of the general formulae described hereinafter, n represents an integer of 1 to 18 which is the number of carbon atoms.

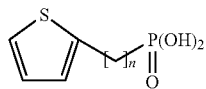

An example of a coupling agent having a molecular structure in which an alkyl group is bonded to the 3- or 4-position of a thiophene ring is represented by the following general formula.

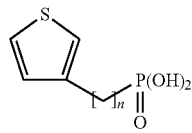

An example of a coupling agent in which the heterocycle forming the conductive polymer monomer is a pyrrole ring and an alkyl group is bonded to the 2- or 5-position of the pyrrole ring is represented by the following general formula:

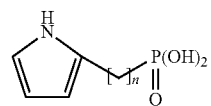

An example of a coupling agent in which the heterocycle forming the conductive polymer monomer is a pyrrole ring and an alkyl group is bonded to the 3- or 4-position of the pyrrole ring is represented by the following general formula:

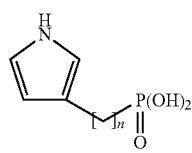

The formation of the coupling agent layer can be implemented by immersion into a solution of coupling agent, electrochemical treatment in a solution of coupling agent, exposure to vapor of a coupling agent or like treatments.

<Conductive Polymer in Conductive Polymer Layer>

Examples of the conductive polymer monomer for forming the conductive polymer in the present invention include pyrrole, thiophene, aniline and their derivatives. The conductive polymer layer in the present invention can be formed such as by chemical oxidative polymerization or electrochemical electrolytic polymerization.

EXAMPLES

Hereinafter, the present invention will be described in more detail with reference to specific examples according to the present invention. However, the present invention is not limited to the following examples.

Examples According to First to Sixth Aspects

Example 1

This example is an example according the first aspect of the invention.

FIG. 1 is a schematic cross-sectional view showing a solid electrolytic capacitor of this example. A part of an anode lead 12 is embedded in an anode 1 of approximately rectangular box shape. A dielectric layer 2 is formed on the surface of the anode 1. The anode 1 is formed of a porous body made by sintering powder of a valve metal or its alloy. Examples of the valve metal include tantalum, niobium, titanium, aluminum, hafnium and zirconium. Examples of the valve metal alloy include alloys containing one of the above valve metals in a content of 50% by atom or more. More specifically, the anode 1 of a porous body is formed by sintering a large number of powder particles spaced apart from each other. Therefore, the dielectric layer 2 is formed on the surfaces of powder particles forming the anode 1.

A first coupling agent layer 3 is formed by subjecting the surface of the dielectric layer 2 to a surface treatment with a coupling agent having a molecular structure containing two phosphoric acid groups. A first conductive polymer layer 4 is formed on the first coupling agent layer 3. The first conductive polymer layer 4 is also formed on part of the first coupling agent layer 3 located inside the anode 1. In this example, the first conductive polymer layer 4 is formed by chemical oxidative polymerization. A second conductive polymer layer 5 is formed on the first conductive polymer layer 4. The second conductive polymer layer 5 is formed to fill in spaces between powder particles forming the anode 1. In this example, the second conductive polymer layer 5 is formed by electrochemical electrolytic polymerization.

A carbon layer 9 is formed on the part of the second conductive polymer layer 5 lying over the outer periphery of the anode 1. The carbon layer 9 is formed by applying a carbon paste to the second conductive polymer layer 5 and drying it. A silver layer 10 is formed on the carbon layer 9. The silver layer 10 is formed by applying a silver paste to the carbon layer 9 and drying it. The carbon layer 9 and the silver layer 10 constitute a cathode layer 11.

Figure 2:
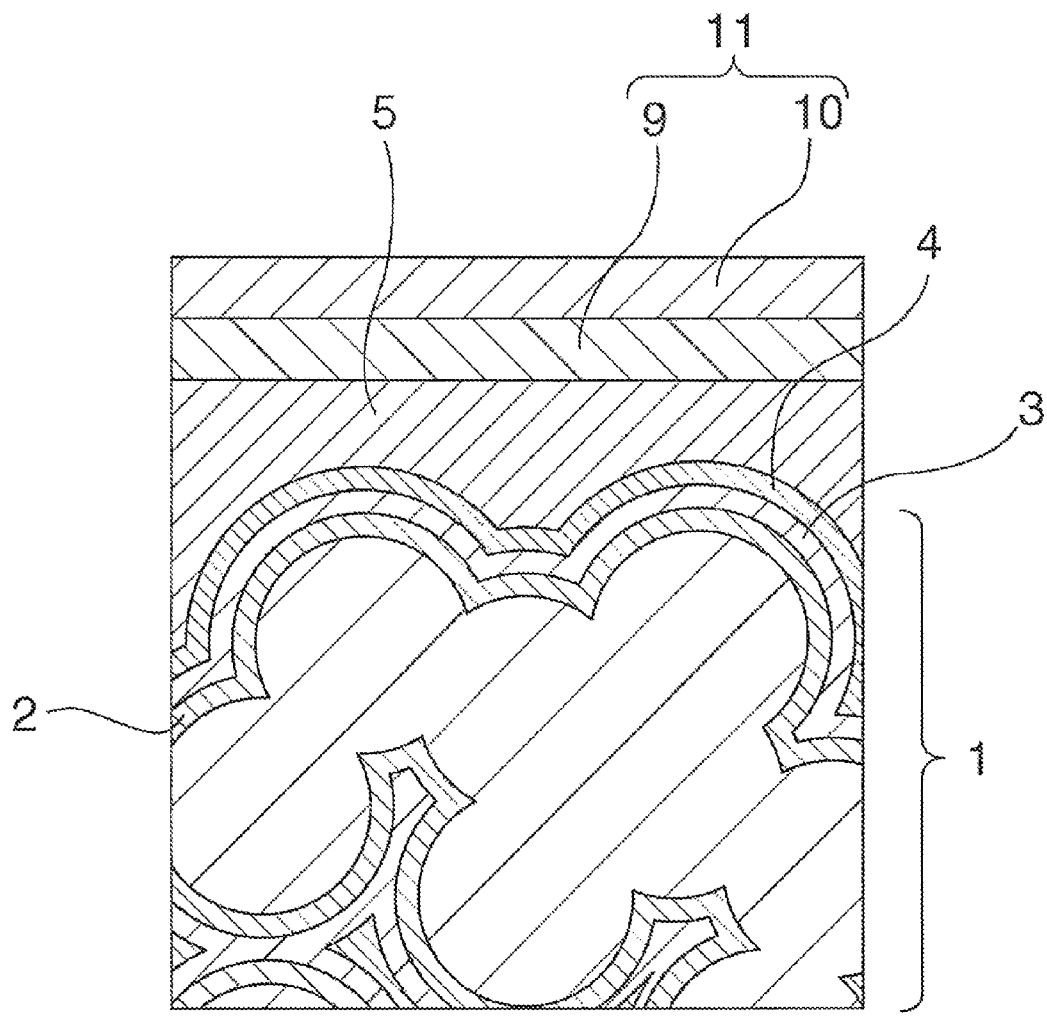
FIG. 2 is a schematic cross-sectional view showing in enlarged dimension an anode, a dielectric layer, a first coupling agent layer, a first conductive polymer layer and a cathode layer in the solid electrolytic capacitor shown in FIG. 1.

FIG. 2 is a schematic cross-sectional view showing in enlarged dimension the interior of the anode 1 in this example. As shown in FIG. 2, the anode 1 is a porous body. The dielectric layer 2 is also formed on the surface of the inner region of the porous body. The first coupling agent layer 3 is formed on the dielectric layer 2. The first conductive polymer layer 4 is formed on the first coupling agent layer 3. The first coupling agent layer 3 and the first conductive polymer layer 4 are also formed inside the porous body serving as the anode 1. The second conductive polymer 5 is formed on the first conductive polymer layer 4. The second conductive polymer layer 5 may also be formed inside the porous body serving as the anode 1.

As described above, the carbon layer 9 and the silver layer 10 are formed on the part of the second conductive polymer layer 5 lying over the outer periphery of the anode 1.

In the above manner, a capacitor element is formed. An anode terminal and a cathode terminal are connected to the capacitor element, and a resin outer package is then molded around the capacitor element to expose the ends of the anode and cathode terminals to the outside, thereby producing a solid electrolytic capacitor. The cathode terminal is connected to the silver layer 10 via a conductive adhesive layer, while the anode terminal is connected to the anode lead 12 such as by welding.

More specifically, the solid electrolytic capacitor of this example was produced in the following manner. The anode 1 has the shape of a rectangular box of 2.3 mm×1.8 mm×1.0 mm, and has the anode lead 12 embedded in a side surface (2.3 mm×1.0 mm) thereof. The anode 1 and the anode lead 12 are made of tantalum (Ta), and the anode 1 is formed of a porous body obtained by sintering tantalum powder. The anode 1 was electrolytically oxidized (anodized) for 10 hours by applying a constant voltage of 10 V to the anode 1 in a phosphoric acid aqueous solution at 65° C., thereby forming a dielectric layer 2 on the surface of the anode 1.

Then, the anode 1 having the dielectric layer 2 formed thereon was immersed for an hour into an isopropyl alcohol solution at 25° C. containing 5 mM (mmol/L) methylenediphosphonic acid (manufactured by Tokyo Chemical Industry Co., Ltd.) serving as a coupling agent having a molecular structure containing two phosphonic acid groups, then picked up, washed with isopropyl alcohol, and dried at 60° C. for 10 minutes. Thus, a first coupling agent layer 3 was formed on the dielectric layer 2. The thickness of the first coupling agent layer 3 was approximately 1 nm.

Then, the anode 1 was immersed into an ethanol solution containing 3.0 M (mol/L) pyrrole for five minutes and then immersed into an aqueous solution containing 0.1 M ammonium persulfate and 0.1 M alkylnaphthalenesulfonic acid at 25° C. for five minutes, thereby forming a first conductive polymer layer 4 on the dielectric layer 2. Then, the anode 1 having the first conductive polymer layer 4 formed thereon was immersed into an aqueous solution at 25° C. containing 0.2 M pyrrole and 0.2 M alkylnaphthalenesulfonic acid, and in the aqueous solution, a constant current of 0.5 mA was passed for three hours using the first conductive polymer layer 4 as an anode, thereby forming a second conductive polymer layer 5.

Next, a carbon paste was applied on the part of the second conductive polymer layer 5 lying over the outer periphery of the anode 1 and then dried, thereby forming a carbon layer 9. A silver paste was applied on the carbon layer 9 and dried, thereby forming a silver layer 10. Subsequently, an anode terminal was welded to the anode lead 12, while a cathode terminal was connected onto the silver layer 10 through a conductive adhesive layer. Then, the capacitor element was covered with epoxy resin by transfer molding to expose the ends of the anode and cathode terminals to the outside, thereby producing a solid electrolytic capacitor A.

Figure 7:
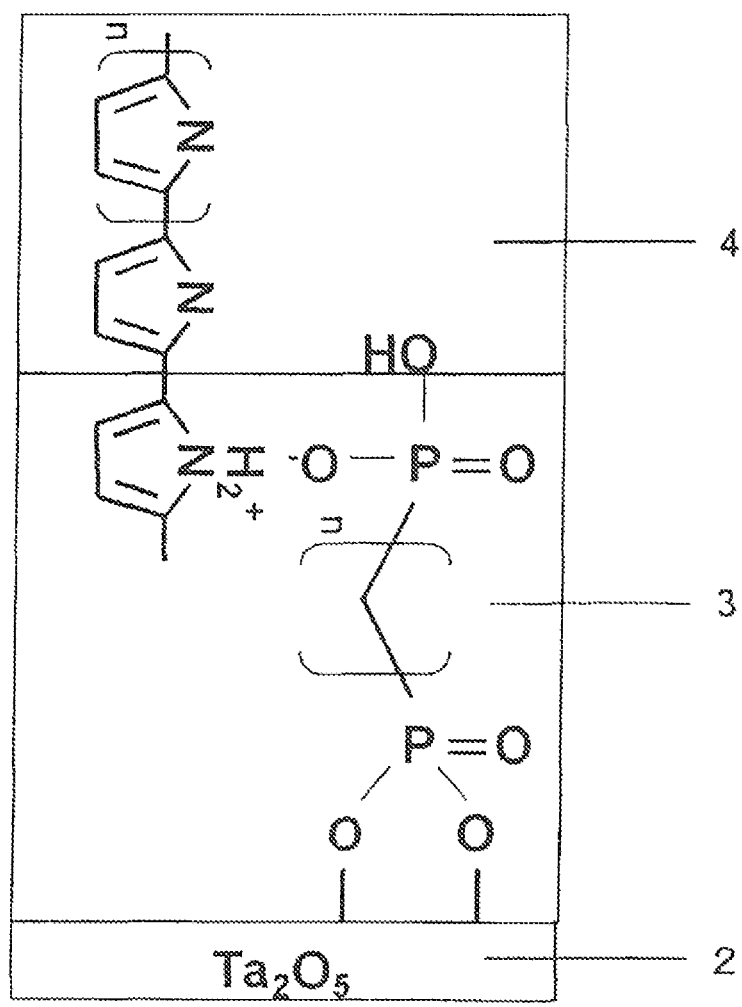
FIG. 7 is a schematic diagram showing bonding states in the dielectric layer, the coupling agent layer and the conductive polymer layer in the embodiment according to the first aspect of the invention.

FIG. 7 is a schematic diagram showing bonding states in the dielectric layer 2, the first coupling agent layer 3 and the first conductive polymer layer 4 in this example. As shown in FIG. 7, one of the phosphonic acid groups in the molecular structure of the coupling agent in the first coupling agent layer 3 is bonded to the dielectric layer 2. On the other hand, the other phosphonic acid group in the molecular structure of the coupling agent in the first coupling agent layer 3 is bonded to the conductive polymer in the first conductive polymer layer 4. Since in this manner the first conductive polymer layer 4 is bonded to the dielectric layer 2 via the first coupling agent layer 3, the interface adherence can be improved, thereby reducing the ESR.

Moreover, since the dielectric layer 2 and the first conductive polymer 4 are bonded via the first coupling agent layer 3, the adherence between them is high, which increases the electrode area of the solid electrolytic capacitor and thereby increases the capacitance thereof.

Example 2

A solid electrolytic capacitor B of this example was produced in the same manner as in Example 1 except that 1,8-octanediphosphonic acid (manufactured by Sigma-Aldrich Corporation) was used as a coupling agent having a molecular structure containing two phosphonic acid groups for use in the first coupling agent layer.

Example 3

A solid electrolytic capacitor C of this example was produced in the same manner as in Example 1 except that 1 mM (12-phosphonododecyl)phosphonic acid (manufactured by Sigma-Aldrich Corporation) was used as a coupling agent having a molecular structure containing two phosphonic acid groups for use in the first coupling agent layer.

Example 4

This example is an example according the third aspect of the invention.

Figure 3:
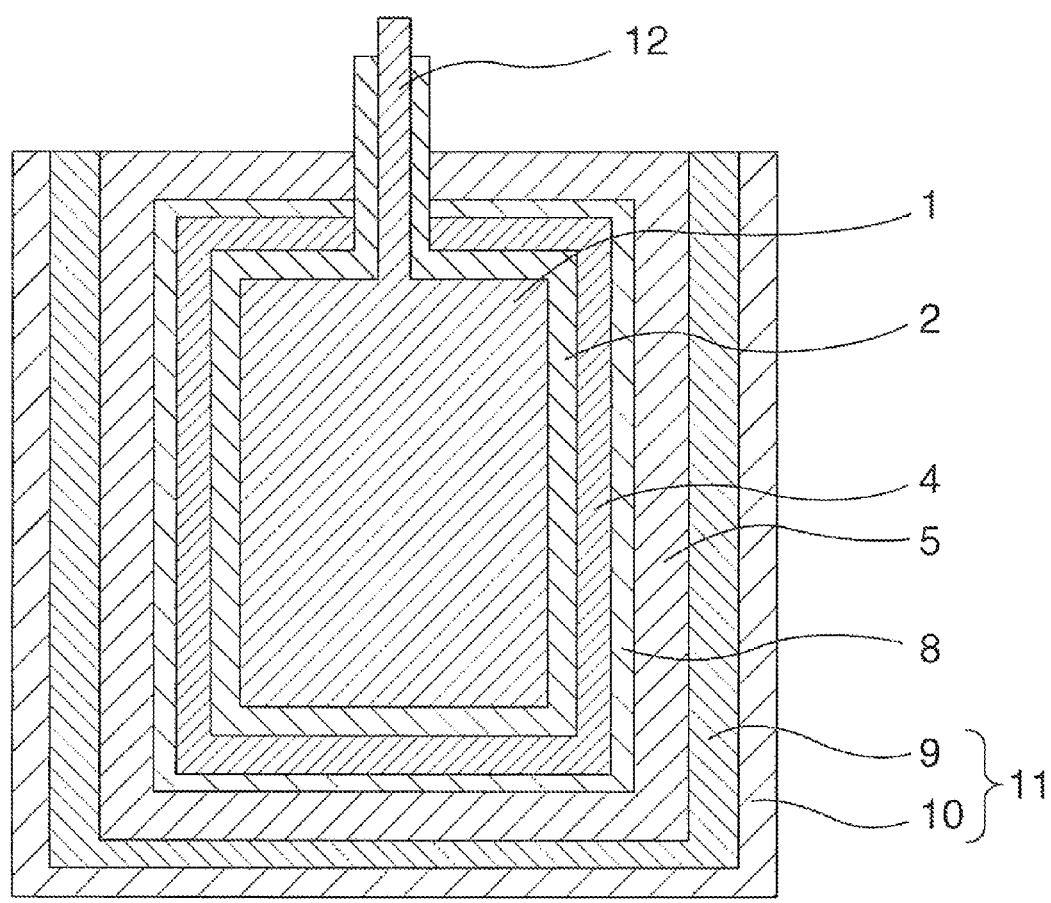
FIG. 3 is a schematic cross-sectional view of a solid electrolytic capacitor representing embodiments according to the third and ninth aspects of the invention.

FIG. 3 is a schematic cross-sectional view showing a solid electrolytic capacitor of this example. As shown in FIG. 3, the solid electrolytic capacitor of this example was formed such that a dielectric layer 2 was formed on an anode 1, a first conductive polymer layer 4 was then formed on the dielectric layer 2, and a second coupling agent layer 8 was formed on the first conductive polymer layer 4. More specifically, the anode 1 was immersed into an ethanol solution containing 3.0 M pyrrole for five minutes and then immersed into an aqueous solution containing 0.1 M ammonium persulfate and 0.1 M alkylnaphthalenesulfonic acid at 25° C. for five minutes, thereby forming a first conductive polymer layer 4 on the dielectric layer 2. Then, the anode 1 was immersed for an hour into an isopropyl alcohol solution at 25° C. containing 1 mM (12-phosphonododecyl)phosphonic acid (manufactured by Sigma-Aldrich Corporation) serving as a coupling agent having a molecular structure containing two phosphonic acid groups, then picked up, washed with isopropyl alcohol, and dried at 60° C. for 10 minutes. Thus, a second coupling agent layer 8 was formed on the first conductive polymer layer 4. After the formation of the second coupling agent layer 8, a second conductive polymer layer 5 was formed in the same manner as in Example 1. After the formation of the second conductive polymer layer 5, like Example 1, a cathode layer 11 was formed, anode and cathode terminals were connected to the capacitor element and a resin outer package was formed, thereby producing a solid electrolytic capacitor D.

Figure 8:
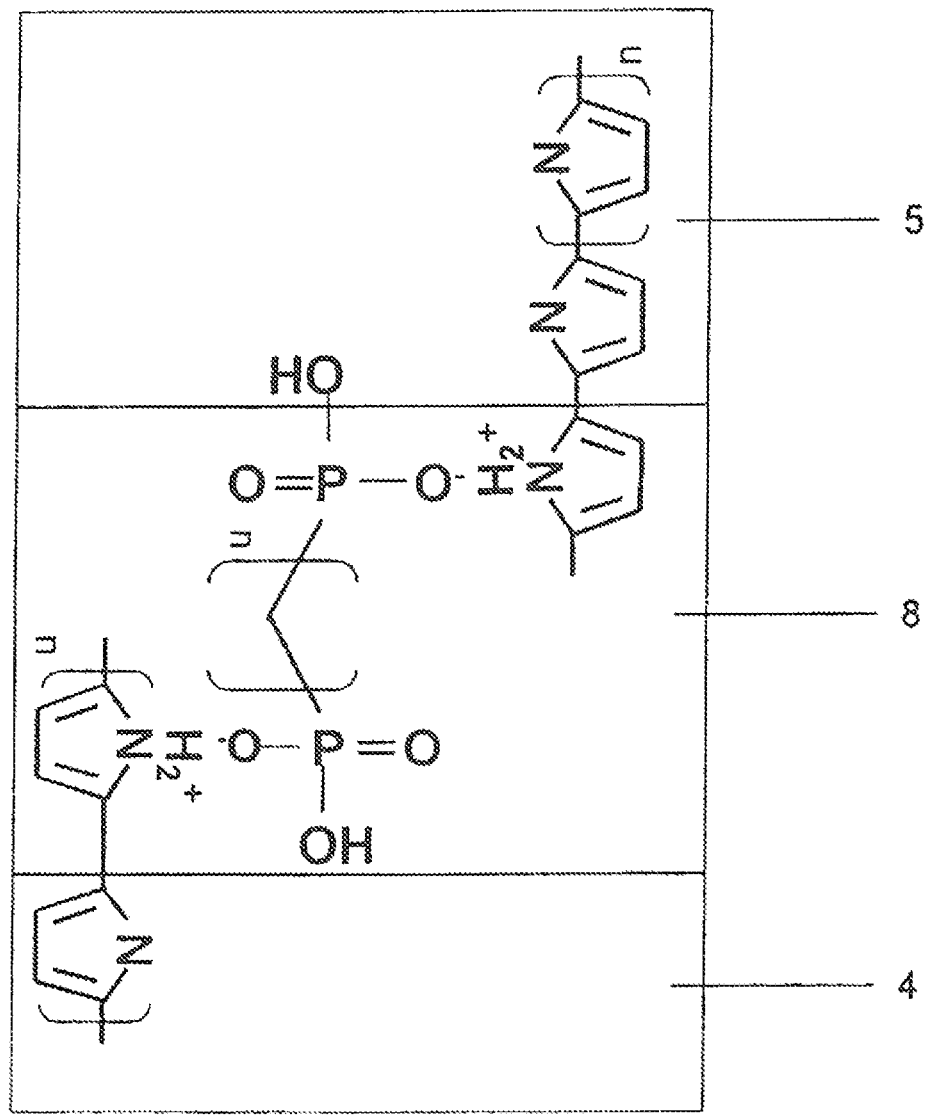
FIG. 8 is a schematic diagram showing bonding states in a first conductive polymer layer, a first coupling agent layer and a second conductive polymer layer in the embodiments according to the second and third aspects of the invention.

FIG. 8 is a schematic diagram showing bonding states in the first conductive polymer layer 4, the second coupling agent layer 8 and the second conductive polymer layer 5 in this example. As shown in FIG. 8, one of the phosphonic acid groups in the molecular structure of the coupling agent in the second coupling agent layer 8 is bonded to a N atom of a pyrrole group in the conductive polymer in the first conductive polymer layer 4. On the other hand, the other phosphonic acid group in the molecular structure of the coupling agent in the second coupling agent layer 8 is bonded to a N atom of a pyrrole group in the conductive polymer in the second conductive polymer layer 5.

Therefore, since the coupling agent in the second coupling agent layer 8 couples between the first and second conductive polymer layers 4 and 5, the adherence between the first and second conductive polymer layers 4 and 5 can be increased, thereby further reducing the ESR.

Example 5

This example is an example according the second aspect of the invention.

Figure 4:
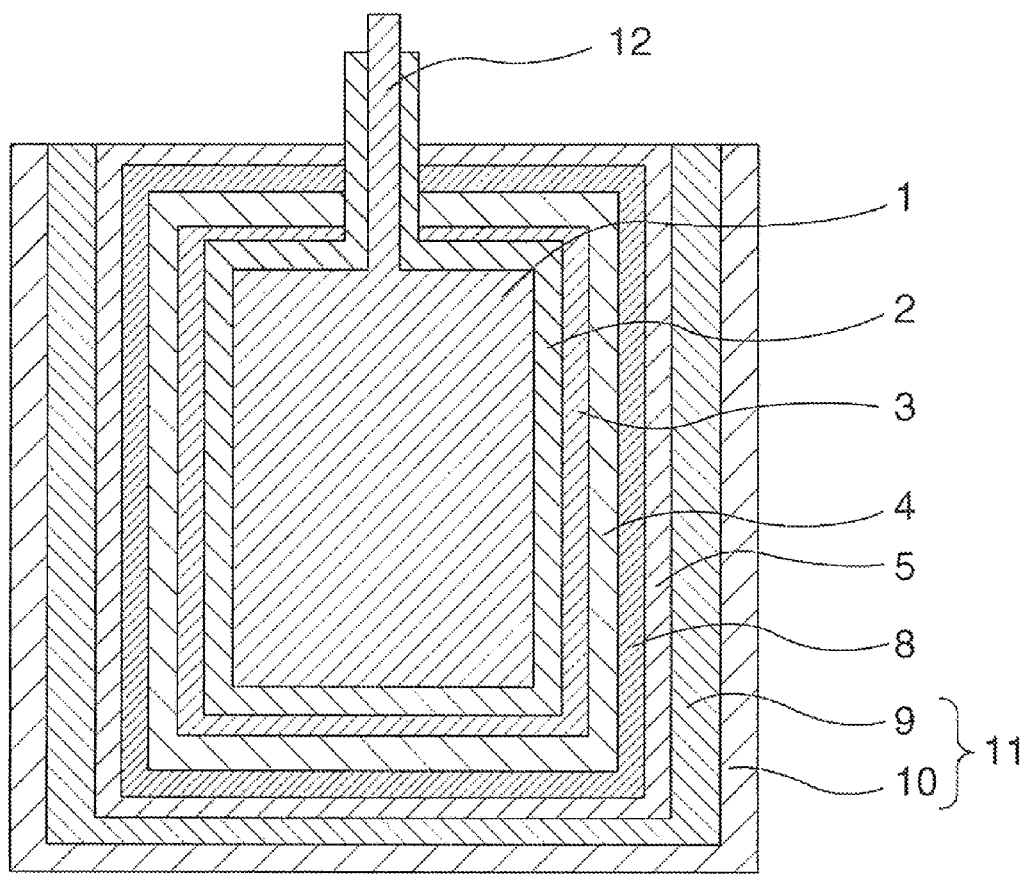
FIG. 4 is a schematic cross-sectional view of a solid electrolytic capacitor representing embodiments according to the second and eighth aspects of the invention.

FIG. 4 is a schematic cross-sectional view showing a solid electrolytic capacitor of this example. As shown in FIG. 4, the solid electrolytic capacitor of this example was formed such that a dielectric layer 2 was formed on an anode 1, a first coupling agent layer 3 and a first conductive polymer layer 4 were then formed on the dielectric layer 2, and a second coupling agent layer 8 was formed on the first conductive polymer layer 4. More specifically, after the formation of the dielectric layer 2, like Example 4, the anode 1 was immersed for an hour into an isopropyl alcohol solution at 25° C. containing 1 mM (12-phosphonododecyl)phosphonic acid (manufactured by Sigma-Aldrich Corporation), then picked up, washed with isopropyl alcohol, and dried at 60° C. for 10 minutes, thereby forming a first coupling agent layer 3. After the formation of the first coupling agent layer 3, a first conductive polymer layer 4 was formed in the same manner as in Example 4. After the formation of the first conductive polymer layer 4, a second coupling agent layer 8 was formed in the same manner as in Example 4. After the formation of the second coupling agent layer 8, a second conductive polymer layer 5 was formed in the same manner as in Example 4. After the formation of the second conductive polymer layer 5, like Example 1, a cathode layer 11 was formed, anode and cathode terminals were connected to the capacitor element and a resin outer package was formed, thereby producing a solid electrolytic capacitor E.

Example 6

This example is an example according the second aspect of the invention.

Figure 5:
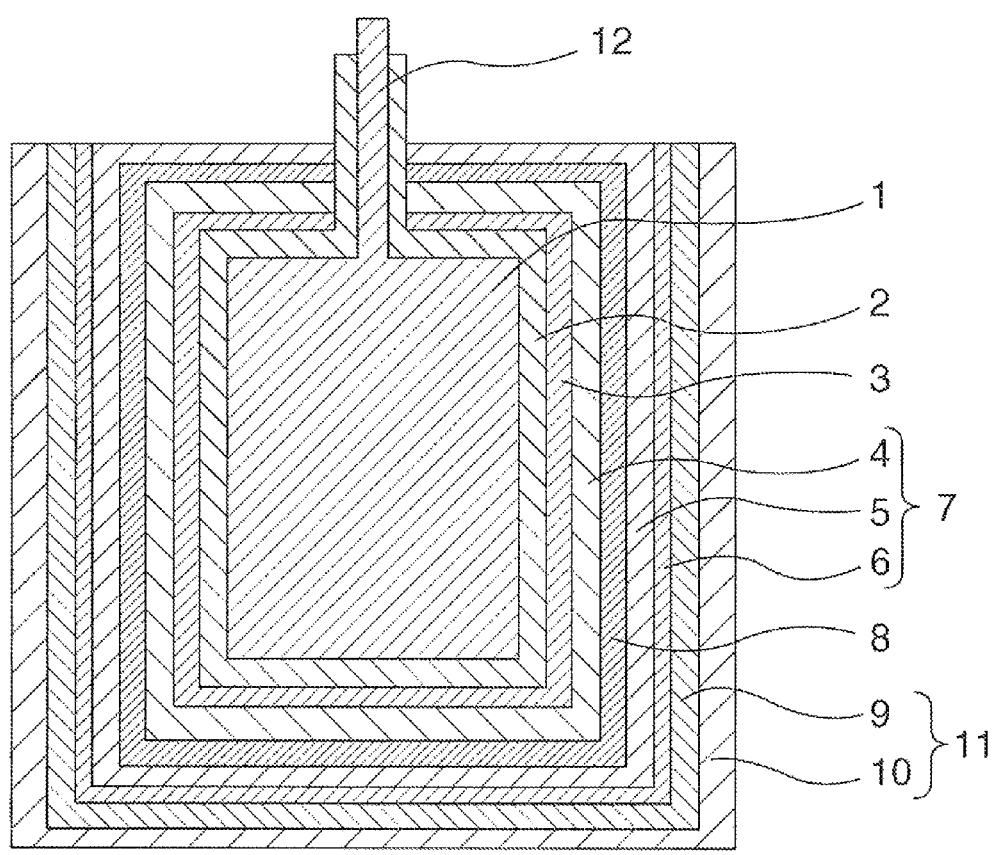
FIG. 5 is a schematic cross-sectional view of a solid electrolytic capacitor representing other embodiments according to the second and eighth aspects of the invention.

FIG. 5 is a schematic cross-sectional view showing a solid electrolytic capacitor of this example. As shown in FIG. 5, this example has a structure in which a conductive polymer layer 7 is formed by forming a plurality of conductive polymer layers by repeated chemical polymerization. Furthermore, 3,4-ethylenedioxythiophene was used as a conductive polymer monomer instead of pyrrole used in Example 1. More specifically, after the formation of a dielectric layer 2, like Example 5, an anode 1 was immersed for an hour into an isopropyl alcohol solution at 25° C. containing 1 mM (12-phosphonododecyl)phosphonic acid (manufactured by Sigma-Aldrich Corporation), then washed with isopropyl alcohol, and dried at 60° C. for 10 minutes, thereby forming a first coupling agent layer 3. After the formation of the first coupling agent layer 3, the anode 1 was immersed into 3,4-ethylenedioxythiophene for five minutes, then immersed into a 40% by mass n-butanol solution of ferric p-toluenesulfonate at 25° C. for one minute, then dried at 60° C. for an hour, then washed with ethanol, thereby forming a first conductive polymer layer 4. After the formation of the first conductive polymer layer 4, a second coupling agent layer 8 was formed in the same manner as in Example 5. After the formation of the second coupling agent layer 8, a second conductive polymer layer 5 was formed, in the same manner as in forming the first conductive polymer layer 4, using 3,4-ethylenedioxythiophene and a 40% by mass n-butanol solution of ferric p-toluenesulfonate. The above cycle consisting of a treatment with the coupling agent and a subsequent formation of a conductive polymer layer was repeated until the conductive polymer layer 7 reached approximately 50 μm, thereby forming a third conductive polymer layer 6. After the formation of the third conductive polymer layer 6, like Example 1, a cathode layer 11 was formed, anode and cathode terminals were connected to the capacitor element and a resin outer package was formed, thereby producing a solid electrolytic capacitor F.

Comparative Example 1

Figure 6:
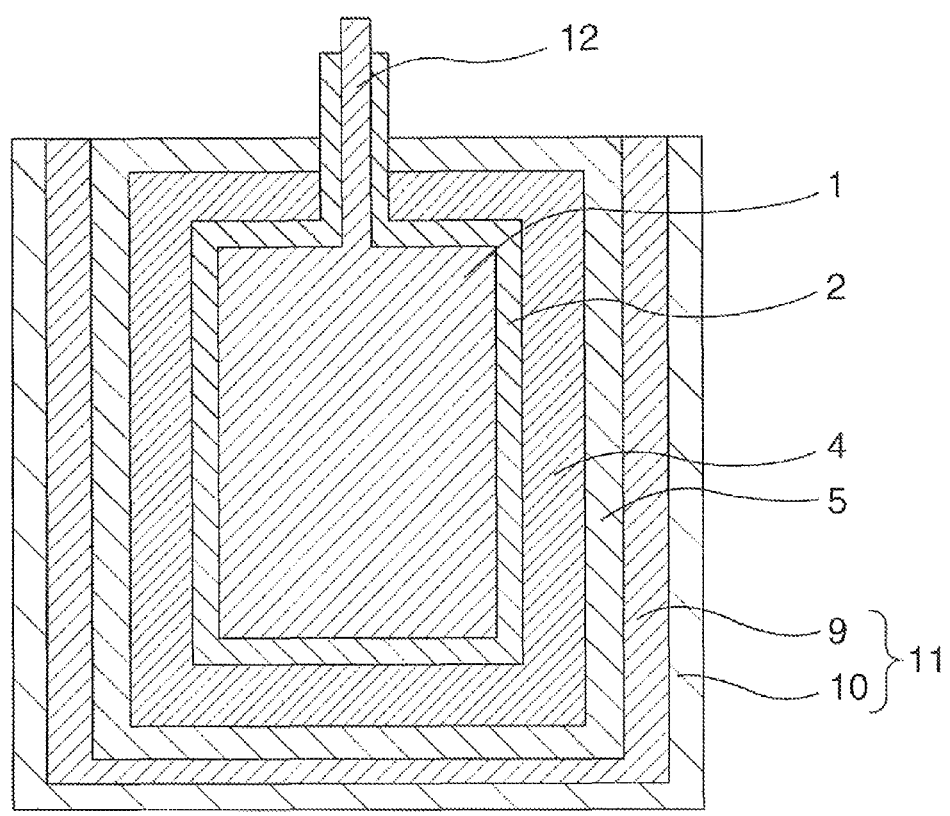
FIG. 6 is a schematic cross-sectional view showing a solid electrolytic capacitor of a comparative example.

FIG. 6 is a schematic cross-sectional view showing a solid electrolytic capacitor of Comparative Example 1. As shown in FIG. 6, in Comparative Example 1, a dielectric layer 2 was formed on an anode 1, and first and second conductive polymer layers 4 and 5 were then formed on the dielectric layer 2. Therefore, no coupling agent layer was formed. In the same manner as in Example 1 except for the above, a solid electrolytic capacitor G was produced.

Comparative Example 2

A silane coupling agent was used instead of the coupling agent used in Example 1 and having a molecular structure in which two phosphonic acid groups are bonded via an alkyl group. The silane coupling agent used was 3-mercaptopropyltrimethoxysilane (marketed as "KBM-803" and manufactured by Shin-Etsu Chemical Co., Ltd.). An anode 1 was immersed into an aqueous solution at 25° C. containing 0.1 M 3-mercaptopropyltrimethoxysilane for 10 minutes, then dried at 130° C. for 30 minutes, then washed with pure water, then dried again at 100° C., thereby forming a first coupling agent layer 3. In the same manner as in Example 1 except for the above, a solid electrolytic capacitor H was produced.

Comparative Example 3

A coupling agent having a molecular structure containing a monophosphonic acid group was used instead of the coupling agent used in Example 3 and having a molecular structure containing two phosphonic acid groups. The coupling agent used was n-dodecylphosphonic acid manufactured by Tokyo Chemical Industry Co., Ltd. More specifically, an anode 1 was immersed for an hour into an isopropyl alcohol solution at 25° C. containing 5 mM dodecylphosphonic acid, then picked up, washed with isopropyl alcohol, and dried at 60° C. for 10 minutes. Thus, a first coupling agent layer 3 was formed on the dielectric layer 2. In the same manner as in Example 1 except for the above, a solid electrolytic capacitor I was produced.

Comparative Example 4

A solid electrolytic capacitor J was produced in the same manner as in Example 4 except that a second coupling agent layer 8 was formed using a coupling agent of the same kind as in Comparative Example 3, instead of the coupling agent used in Example 4 and having a molecular structure containing two phosphonic acid groups.

Comparative Example 5

A solid electrolytic capacitor K was produced in the same manner as in Example 5 except that first and second coupling agent layers 3 and 8 were formed using a coupling agent of the same kind as in Comparative Example 3, instead of the coupling agent used in Example 5 and having a molecular structure containing two phosphonic acid groups.

Comparative Example 6

A solid electrolytic capacitor L was produced in the same manner as in Example 6 except that coupling agent layers 3 and 8 were formed using a coupling agent of the same kind as in Comparative Example 3, instead of the coupling agent used in Example 6 and having a molecular structure containing two phosphonic acid groups.

[Evaluation of Characteristics of Solid Electrolytic Capacitors]

The solid electrolytic capacitors A to C of Examples 1 to 3 and the solid electrolytic capacitors C to I of Comparative Examples 1 to 3 were measured in terms of capacitance and ESR. The capacitance was measured using an LCR meter (inductance-capacitance-resistance meter) with a frequency 120 Hz. The ESR was measured using the LCR meter with a frequency of 100 kHz. The measurement results are shown in TABLE 1. Note that the values shown in TABLE 1 are relative values with reference to those of Comparative Example 1.

TABLE 1

|  | Solid Electrolytic Capacitor A | Solid Electrolytic Capacitor B | Solid Electrolytic Capacitor C | Solid Electrolytic Capacitor G | Solid Electrolytic Capacitor H | Solid Electrolytic Capacitor I |
|---|---|---|---|---|---|---|
| Capacitance | 1.06 | 1.05 | 1.03 | 1.00 | 1.04 | 1.04 |
| ESR | 0.87 | 0.89 | 0.90 | 1.00 | 1.00 | 0.97 |

The solid electrolytic capacitors A to C of Examples 1 to 3 according to the first aspect of the invention exhibited increased capacitances and reduced ESRs as compared to the solid electrolytic capacitors G to I of Comparative Examples 1 to 3. The increase in capacitance can be attributed to the fact that the coverage with the conductive polymer layer was improved by forming a coupling agent layer according to the first aspect of the invention. The reduction in ESR can be attributed to the fact that the adherence of the conductive polymer layer to the dielectric layer and the adherence of the conductive polymer layer to the other conductive polymer layer were made firmer, whereby the contact resistance between the dielectric and conductive polymer layers and the contact resistance between both the conductive polymer layers were reduced.

Furthermore, if the length of the alkyl chain connecting two phosphonic acid groups in the coupling agent is short, the ESR can be effectively reduced. Moreover, if comparison is made between the solid electrolytic capacitor C of Example 3 using the coupling agent having a molecular structure in which two phosphonic acid groups are bonded via an alkyl group and the solid electrolytic capacitor I of Comparative Example 3 using the coupling agent having a molecular structure containing a single phosphonic acid group, this shows that the capacitance and ESR can be increased and reduced, respectively, by using a coupling agent having a molecular structure containing two phosphonic acid groups. The increase in capacitance can be attributed to the fact that the coupling agent having a molecular structure containing two phosphonic acid groups can provide a higher coverage of the dielectric layer with the conductive polymer layer, i.e., provide a greater electrode area. The reduction in ESR can be attributed to the fact that the adherence between the dielectric layer and the conductive polymer layer can be increased owing to chemical bonding between them to reduce the contact resistance.

The solid electrolytic capacitor D of Example 4 and the solid electrolytic capacitor J of Comparative Example 4 were also measured in terms of capacitance and ESR in the same manner as above. The measurement results are shown in TABLE 2. Note that the values shown in TABLE 2 are relative values with reference to those of Comparative Example 4.

TABLE 2

|  | Solid Electrolytic Capacitor D | Solid Electrolytic Capacitor J |
|---|---|---|
| Capacitance | 1.05 | 1.00 |
| ESR | 0.97 | 1.00 |

Comparison between the solid electrolytic capacitor D of Example 4 and the solid electrolytic capacitor J of Comparative Example 4 shows that the solid electrolytic capacitor D of Example 4 using the coupling agent having a molecular structure containing two phosphonic acid groups exhibited reduced ESR. The reason for this can be attributed to the fact that as compared to the coupling agent having a molecular structure containing a single phosphonic acid group, the coupling agent having a molecular structure containing two phosphonic acid groups improves the adherence between both the conductive polymer layers owing to chemical bonding between them to reduce the contact resistance, thereby reducing the ESR.

The solid electrolytic capacitor E of Example 5 and the solid electrolytic capacitor K of Comparative Example 5 were also measured in terms of capacitance and ESR in the same manner as above. The measurement results are shown in TABLE 3. Note that the values shown in TABLE 3 are relative values with reference to those of Comparative Example 5.

TABLE 3

|  | Solid Electrolytic Capacitor E | Solid Electrolytic Capacitor K |
| --- | --- | --- |
| Capacitance | 1.02 | 1.00 |
| ESR | 0.98 | 1.00 |

It can be understood that since the solid electrolytic capacitor E of Example 5 includes the first coupling agent layer 3 formed between the dielectric layer 2 and the first conductive polymer layer 4 and the second coupling agent layer 8 formed between the first and second conductive polymer layers 4 and 5, the capacitance can be further increased and the ESR can be further reduced.

The solid electrolytic capacitor F of Example 6 and the solid electrolytic capacitor L of Comparative Example 6 were also measured in terms of capacitance and ESR in the same manner as above. The measurement results are shown in TABLE 4. Note that the values shown in TABLE 4 are relative values with reference to those of Comparative Example 6.

TABLE 4

|  | Solid Electrolytic Capacitor F | Solid Electrolytic Capacitor L |
| --- | --- | --- |
| Capacitance | 1.01 | 1.00 |
| ESR | 0.98 | 1.00 |

It can be understood that since in the solid electrolytic capacitor F of Example 6 high-electrical conductivity poly(3,4-ethylenedioxythiophene) was used for the conductive polymer layer instead of polypyrrole, the use of such a high-electrical conductivity conductive polymer can provide further reduction in ESR.

Examples According to Seventh to Twelfth Aspects

Synthesis Example 1

An amount of 5.05 g (60 mmol) of thiophene (purity: 99% by mass) was dissolved in 200 ml of tetrahydrofuran (THF). The solution was cooled to −70° C., followed by dropwise addition via a syringe of 41 mL of 1.6 M n-butyllithium (n-BuLi) in hexane (65.6 mmol, 1.09 eq.) to the solution while stirring with a magnet stirrer. Then, the solution was gradually warmed to −50° C., followed by dropwise addition via a syringe of a solution obtained by diluting 12.96 g of 1,4-dibromobutane with 50 mL of THF. The mixed solution was stirred at −50° C. for 30 minutes, and then gradually warmed to room temperature with stirring, followed by allowing the solution to react for 10 hours. The reaction was terminated by adding 50 mL of pure water to the solution, and the reaction solution was moved to a separating funnel. To the reaction solution in the funnel was further added 100 mL of pure water to wash the reaction solution, and a reaction product was extracted into an oil layer. The layer containing the reaction product was concentrated with a rotary evaporator to give a crude product. Then, the crude product was purified on a silica gel column using hexane as an extraction liquid. The amount of product (2-(4-bromobutylthiophene)) yielded was 6.75 g (30 mmol, yield: 50%).

Next, 5.0 g (30 mmol) of triethyl phosphite was added to the product with stirring, followed by gradually warming from room temperature to 140° C. Then, the product underwent reaction at 140° C. for three hours. The product was cooled to room temperature, and the solvent was removed. Thereafter, the product was purified on a silica gel column, thereby obtaining 5.8 g of ethyl phosphite compound (21 mmol, the yield from 2-(4-bromobutylthiophene): 70%). To the obtained compound were added bromotrimethylsilane and methylene chloride, followed by undergoing reaction at 5° C. for four hours. The solvent in the reaction solution was removed, followed by addition of toluene and water and stirring overnight. The reaction solution was concentrated to obtain a concentrate. The concentrate was washed by adding toluene, and then dried, thereby obtaining 4.1 g of 4-thienyl-butylphosphonic acid (TC4PHO) (18.9 mmol, total yield: 31.5%) as an objective substance.

The reaction formulae of the reactions in this synthesis example are as follows:

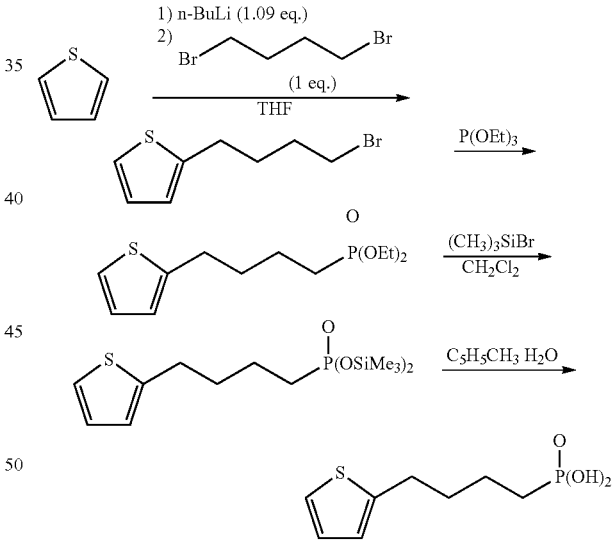

Synthesis Example 2

Synthesis was performed in the same manner as in Synthesis Example 1 except for the use of 1,8-dibromooctane instead of 1,4-dibromobutane, thereby obtaining 4-thienyloctylphosphonic acid (TC8PHO).

Synthesis Example 3

Synthesis was performed in the same manner as in Synthesis Example 1 except for the use of 1,12-dibromododecane instead of 1,4-dibromobutane, thereby obtaining 4-thienyldodecylphosphonic acid (TC12PHO).

Example 7

This example is an example according to the seventh aspect of the invention.

FIG. 1 is a schematic cross-sectional view showing a solid electrolytic capacitor of this example. The solid electrolytic capacitor of this example was produced in substantially the same manner as in Example 1 except that a coupling agent having a molecular structure containing a phosphonic acid group and a conductive polymer monomer was used as a coupling agent for forming the first coupling agent layer 3.

More specifically, the solid electrolytic capacitor of this example was produced in the following manner. A dielectric layer 2 was formed on the surface of an anode 1 in the same manner as in Example 1.

Then, the anode 1 having the dielectric layer 2 formed thereon was immersed for an hour into an isopropyl alcohol solution at 25° C. containing 0.5 mM (mmol/L) 4-thienylbutylphosphonic acid (hereinafter referred to as TC4PHO) serving as a coupling agent containing phosphonic acid groups, then picked up, washed with isopropyl alcohol, and dried at 60° C. for 10 minutes. Thus, a first coupling agent layer 3 was formed on the dielectric layer 2. The thickness of the first coupling agent layer 3 was approximately 1 nm.

Then, the anode 1 was immersed into an ethanol solution containing 3.0 M pyrrole for five minutes and then immersed into a 40% by mass n-butanol solution of ferric p-toluenesulfonate at 25° C. for one minute, thereby forming a first conductive polymer layer 4 on the first coupling agent layer 3. Then, the anode 1 having the first conductive polymer layer 4 formed thereon was immersed into an aqueous solution at 25° C. containing 0.2 M pyrrole and 0.2 M alkylnaphthalenesulfonic acid, and in the aqueous solution, a constant current of 0.5 mA was passed for three hours using the first conductive polymer layer 4 as an anode, thereby forming a second conductive polymer layer 5.

Next, a carbon paste was applied on the part of the second conductive polymer layer 5 lying over the outer periphery of the anode 1 and then dried, thereby forming a carbon layer 9. A silver paste was applied on the carbon layer 9 and dried, thereby forming a silver layer 10. Subsequently, an anode terminal was welded to the anode lead 12, while a cathode terminal was connected onto the silver layer 10 through a conductive adhesive layer. Then, the capacitor element was covered with epoxy resin by transfer molding to expose the ends of the anode and cathode terminals to the outside, thereby producing a solid electrolytic capacitor M.

Figure 9:
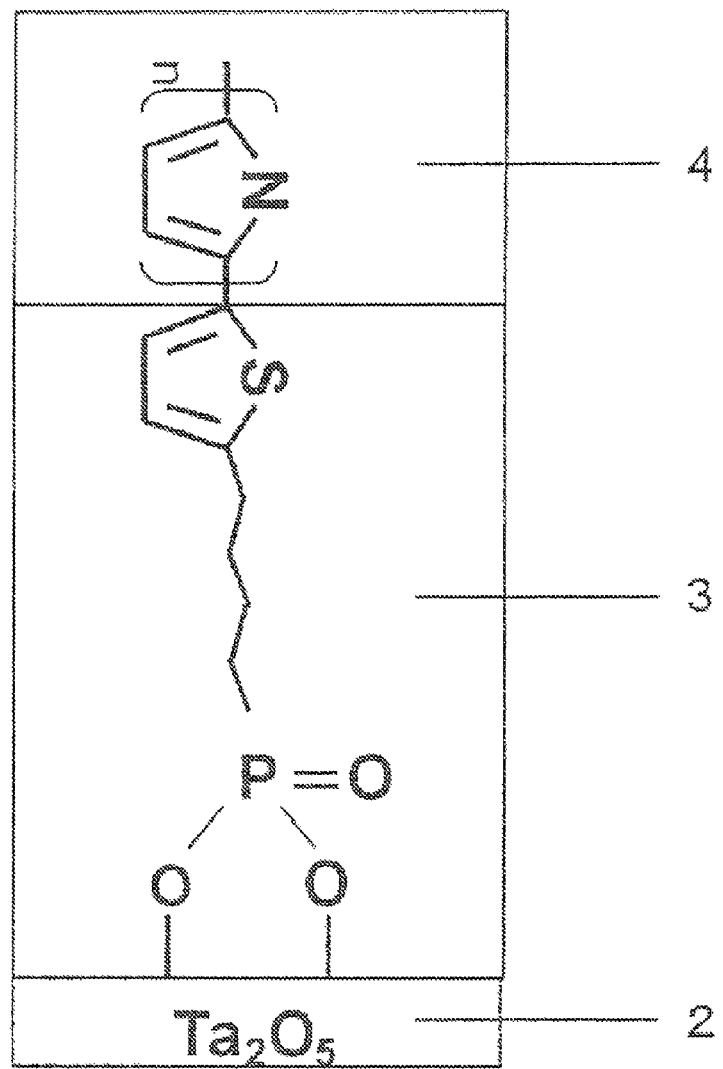
FIG. 9 is a schematic diagram showing bonding states in the dielectric layer, the coupling agent layer and the conductive polymer layer in the embodiment according to the seventh aspect of the invention.

FIG. 9 is a schematic diagram showing bonding states in the dielectric layer 2, the first coupling agent layer 3 and the first conductive polymer layer 4 in this example. As shown in FIG. 9, a phosphonic acid group in the molecular structure of the coupling agent in the first coupling agent layer 3 is bonded to the dielectric layer 2. On the other hand, a thiophene ring serving as a conductive polymer monomer in the molecular structure of the coupling agent in the first coupling agent layer 3 is bonded to the conductive polymer in the first conductive polymer layer 4. Since in this manner the first conductive polymer layer 4 is bonded to the dielectric layer 2 via the first coupling agent layer 3, the interface adherence can be improved, thereby reducing the ESR.

Moreover, since the dielectric layer 2 and the first conductive polymer 4 are covalently bonded via the first coupling agent layer 3, the adherence between them is high, which increases the electrode area of the solid electrolytic capacitor and thereby increases the capacitance thereof.

Example 8

A solid electrolytic capacitor N of this example was produced in the same manner as in Example 7 except that 4-thienyloctylphosphonic acid (hereinafter referred to as TC8PHO) was used as a coupling agent containing phosphonic acid groups for use in the first coupling agent layer.

Example 9

A solid electrolytic capacitor O of this example was produced in the same manner as in Example 7 except that 4-thienyldodecylphosphonic acid (hereinafter referred to as TC12PHO) was used as a coupling agent containing phosphonic acid groups for use in the first coupling agent layer.

Example 10

This example is an example according the ninth aspect of the invention.

FIG. 3 is a schematic cross-sectional view showing a solid electrolytic capacitor of this example. As shown in FIG. 3, the solid electrolytic capacitor of this example was formed such that a dielectric layer 2 was formed on an anode 1, a first conductive polymer layer 4 was then formed on the dielectric layer 2, and a second coupling agent layer 8 was formed on the first conductive polymer layer 4. More specifically, the anode 1 was immersed into an ethanol solution containing 3.0 M pyrrole for five minutes and then immersed into an aqueous solution containing 0.1 M ammonium persulfate and 0.1 M alkylnaphthalenesulfonic acid at 25° C. for five minutes, thereby forming a first conductive polymer layer 4 on the dielectric layer 2. Then, the anode 1 was immersed for an hour into an isopropyl alcohol solution at 25° C. containing 0.5 mM TC4PHO serving as a coupling agent containing phosphonic acid groups, then picked up, washed with isopropyl alcohol, and dried at 60° C. for 10 minutes. Thus, a second coupling agent layer 8 was formed on the first conductive polymer layer 4. After the formation of the second coupling agent layer 8, a second conductive polymer layer 5 was formed in the same manner as in Example 7. After the formation of the second conductive polymer layer 5, like Example 7, a cathode layer 11 was formed, anode and cathode terminals were connected to the capacitor element and a resin outer package was formed, thereby producing a solid electrolytic capacitor P.

Figure 10:
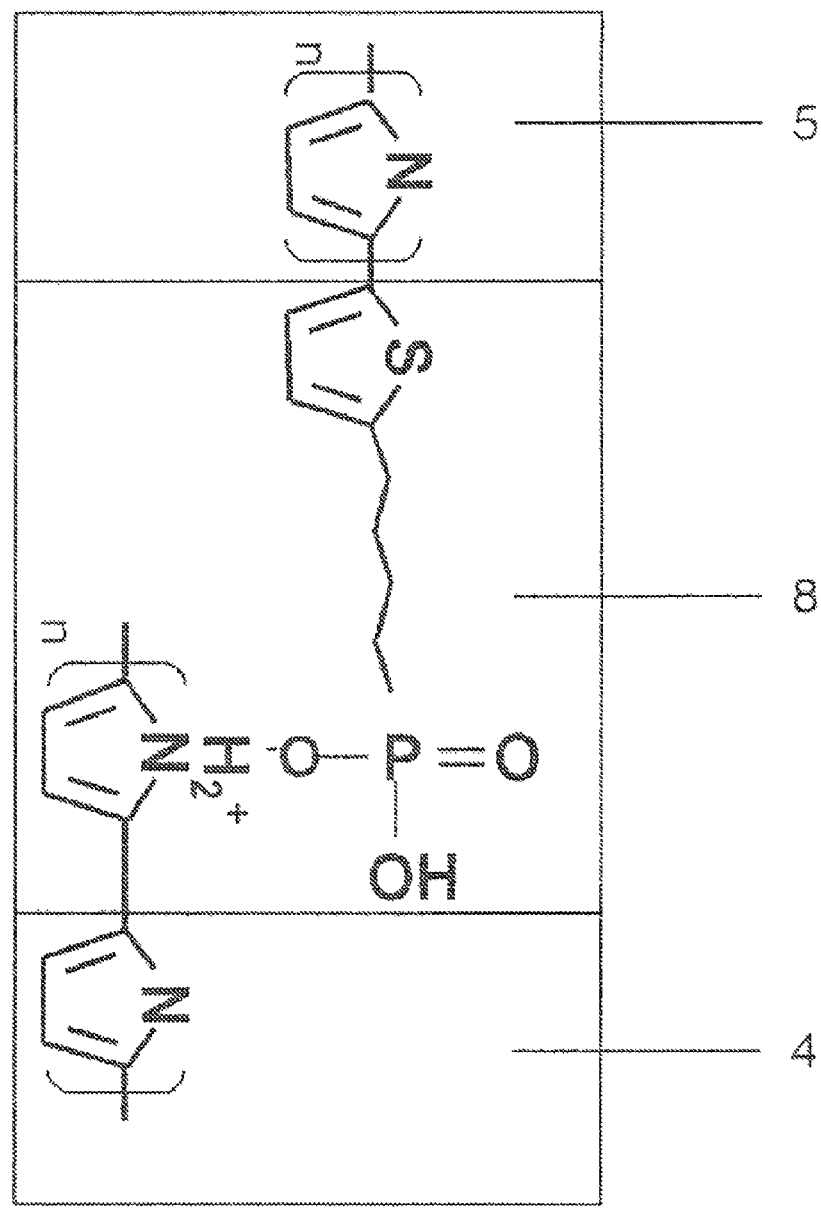
FIG. 10 is a schematic diagram showing bonding states in a first conductive polymer layer, a first coupling agent layer and a second conductive polymer layer in the embodiments according to the eighth and ninth aspects of the invention.

FIG. 10 is a schematic diagram showing bonding states in the first conductive polymer layer 4, the second coupling agent layer 8 and the second conductive polymer layer 5 in this example. As shown in FIG. 10, a phosphonic acid group in the molecular structure of the coupling agent in the second coupling agent layer 8 is bonded to a N atom of a pyrrole group in the conductive polymer in the first conductive polymer layer 4. On the other hand, a thiophene ring forming as a conductive polymer monomer in the molecular structure in the second coupling agent layer 8 is covalently bonded to the conductive polymer in the second conductive polymer layer 5. As shown in FIG. 10, in this example, the conductive polymer in the second conductive polymer layer is bonded to the 2- or 5-position of the thiophene ring in the coupling agent.

Therefore, since the coupling agent in the second coupling agent layer 8 couples between the first and second conductive polymer layers 4 and 5, the adherence between the first and second conductive polymer layers 4 and 5 can be increased, thereby further reducing the ESR.

Example 11

This example is an example according the eighth aspect of the invention.

FIG. 4 is a schematic cross-sectional view showing a solid electrolytic capacitor of this example. As shown in FIG. 4, the solid electrolytic capacitor of this example was formed such that a dielectric layer 2 was formed on an anode 1, a first coupling agent layer 3 and a first conductive polymer layer 4 were then formed on the dielectric layer 2, and a second coupling agent layer 8 was formed on the first conductive polymer layer 4. More specifically, after the formation of the dielectric layer 2, like Example 7, the anode 1 was immersed for an hour into an isopropyl alcohol solution at 25° C. containing 0.5 mM TC4PHO, then washed with isopropyl alcohol, and dried at 60° C. for 10 minutes, thereby forming a first coupling agent layer 3. After the formation of the first coupling agent layer 3, a first conductive polymer layer 4 was formed in the same manner as in Example 7. After the formation of the first conductive polymer layer 4, a second coupling agent layer 8 was formed in the same manner as in Example 10. After the formation of the second coupling agent layer 8, a second conductive polymer layer 5 was formed in the same manner as in Example 7. After the formation of the second conductive polymer layer 5, like Example 7, a cathode layer 11 was formed, anode and cathode terminals were connected to the capacitor element and a resin outer package was formed, thereby producing a solid electrolytic capacitor Q.

In this example, bonding states shown in FIG. 9 are formed between the dielectric layer 2, the first coupling agent layer 3 and the first conductive polymer layer 4. Furthermore, bonding states shown in FIG. 10 are formed between the first conductive polymer layer 4, the second coupling agent layer 8 and the second conductive polymer layer 5.

Example 12

This example is an example according the eighth aspect of the invention.

FIG. 5 is a schematic cross-sectional view showing a solid electrolytic capacitor of this example. As shown in FIG. 5, this example has a structure in which a conductive polymer layer 7 is formed by forming a plurality of conductive polymer layers by repeated chemical polymerization. Furthermore, 3,4-ethylenedioxythiophene was used as a conductive polymer monomer instead of pyrrole used in Example 7. More specifically, after the formation of an dielectric layer 2, like Example 7, an anode 1 was immersed for an hour into an isopropyl alcohol solution at 25° C. containing 0.5 mM TC4PHO, then washed with isopropyl alcohol, and dried at 60° C. for 10 minutes, thereby forming a first coupling agent layer 3. After the formation of the first coupling agent layer 3, the anode 1 was immersed into 3,4-ethylenedioxythiophene for five minutes, then immersed into a 40% by mass n-butanol solution of ferric p-toluenesulfonate at 25° C. for one minute, then dried at 60° C. for an hour, then washed with ethanol, thereby forming a first conductive polymer layer 4. After the formation of the first conductive polymer layer 4, a second coupling agent layer 8 was formed in the same manner as in Example 10. After the formation of the second coupling agent layer 8, a second conductive polymer layer 5 was formed, in the same manner as in forming the first conductive polymer layer 4, using 3,4-ethylenedioxythiophene and a 40% by mass n-butanol solution of ferric p-toluenesulfonate. The above cycle consisting of a treatment with the coupling agent and a subsequent formation of a conductive polymer layer was repeated until the conductive polymer layer 7 reached approximately 50 μm, thereby forming a third conductive polymer layer 6. After the formation of the third conductive polymer layer 6, like Example 7, a cathode layer 11 was formed, anode and cathode terminals were connected to the capacitor element and a resin outer package was formed, thereby producing a solid electrolytic capacitor R.

Comparative Example 7

FIG. 6 is a schematic cross-sectional view showing a solid electrolytic capacitor of Comparative Example 7. As shown in FIG. 6, in Comparative Example 7, a dielectric layer 2 was formed on an anode 1, and first and second conductive polymer layers 4 and 5 were then formed on the dielectric layer 2. Therefore, no coupling agent layer was formed. In the same manner as in Example 7 except for the above, a solid electrolytic capacitor S was produced.

Comparative Example 8

A silane coupling agent was used instead of the coupling agent used in Example 7 and having a molecular structure in which a phosphonic acid group and a conductive polymer monomer are bonded via an alkyl group. The silane coupling agent used was 3-mercaptopropyltrimethoxysilane (marketed as "KBM-803" and manufactured by Shin-Etsu Chemical Co., Ltd.). An anode 1 was immersed into an aqueous solution at 25° C. containing 0.1 M 3-mercaptopropyltrimethoxysilane for 10 minutes, then dried at 130° C. for 30 minutes, then washed with pure water, then dried again at 100° C., thereby forming a first coupling agent layer 3. In the same manner as in Example 7 except for the above, a solid electrolytic capacitor T was produced.

Comparative Example 9

A coupling agent containing phosphonic acid groups was used instead of the coupling agent used in Example 7 and having a molecular structure in which a phosphonic acid group and a conductive polymer monomer are bonded via an alkyl group. The coupling agent used was octadecylphosphonic acid. More specifically, an anode 1 was immersed for an hour into an isopropyl alcohol solution at 25° C. containing 0.5 mM octadecylphosphonic acid, then picked up, washed with isopropyl alcohol, and dried at 60° C. for 10 minutes. Thus, a first coupling agent layer 3 was formed on the dielectric layer 2. In the same manner as in Example 7 except for the above, a solid electrolytic capacitor U was produced.

Comparative Example 10

A solid electrolytic capacitor V was produced in the same manner as in Example 10 except that a second coupling agent layer 8 was formed using a coupling agent of the same kind as in Comparative Example 9, instead of the coupling agent used in Example 10 and having a molecular structure in which a phosphonic acid group and a conductive polymer monomer are bonded via an alkyl group.

Comparative Example 11

A solid electrolytic capacitor W was produced in the same manner as in Example 11 except that first and second coupling agent layers 3 and 8 were formed using a coupling agent of the same kind as in Comparative Example 9, instead of the coupling agent used in Example 11 and having a molecular structure in which a phosphonic acid group and a conductive polymer monomer are bonded via an alkyl group.

Comparative Example 12

A solid electrolytic capacitor X was produced in the same manner as in Example 12 except that first and second coupling agent layers 3 and 8 were formed using a coupling agent of the same kind as in Comparative Example 9, instead of the coupling agent used in Example 12 and having a molecular structure in which a phosphonic acid group and a conductive polymer monomer are bonded via an alkyl group.

[Evaluation of Characteristics of Solid Electrolytic Capacitors]

The solid electrolytic capacitors M to O of Examples 7 to 9 and the solid electrolytic capacitors S to U of Comparative Examples 7 to 9 were measured in terms of capacitance and ESR. The capacitance was measured using an LCR meter (inductance-capacitance-resistance meter) with a frequency 120 Hz. The ESR was measured using the LCR meter with a frequency of 100 kHz. The measurement results are shown in TABLE 5. Note that the values shown in TABLE 5 are relative values with reference to those of Comparative Example 7.

TABLE 5

|  | Solid Electrolytic Capacitor M | Solid Electrolytic Capacitor N | Solid Electrolytic Capacitor O | Solid Electrolytic Capacitor S | Solid Electrolytic Capacitor T | Solid Electrolytic Capacitor U |
|---|---|---|---|---|---|---|
| Capacitance | 1.07 | 1.06 | 1.05 | 1.00 | 1.04 | 1.04 |
| ESR | 0.90 | 0.92 | 0.95 | 1.00 | 1.00 | 0.97 |

The solid electrolytic capacitors M to O of Examples 7 to 9 according to the seventh aspect of the invention exhibited increased capacitances and reduced ESRs as compared to the solid electrolytic capacitors S to U of Comparative Examples 7 to 9. The increase in capacitance can be attributed to the fact that since according to the seventh aspect of the invention the first coupling agent layer was formed on the dielectric layer and the first conductive polymer layer was formed on the first coupling agent layer, the coverage of the dielectric layer with the first conductive polymer layer was improved. The reduction in ESR can be attributed to the fact that the adherence of the first conductive polymer layer to the dielectric layer was made firmer, whereby the contact resistance between the dielectric layer and the first conductive polymer layer was reduced. Furthermore, as is apparent from comparison among Examples 7 to 9, if the length of the alkyl chain connecting a phosphonic acid group and a conductive polymer monomer in the coupling agent is short, the ESR can be effectively reduced.

Moreover, comparison between the solid electrolytic capacitor M of Example 7 and the solid electrolytic capacitor U of Comparative Example shows that the capacitance and ESR can be increased and reduced, respectively, by using a coupling agent having a molecular structure containing a conductive polymer monomer. The increase in capacitance can be attributed to the fact that the coupling agent having a molecular structure containing a conductive polymer monomer can provide a higher coverage of the dielectric layer with the conductive polymer, i.e., provide a greater electrode area. The reduction in ESR can be attributed to the fact that the adherence between the dielectric layer and the conductive polymer layer can be increased owing to covalent bonding between them to reduce the contact resistance.

The solid electrolytic capacitors P to R of Examples to 12 and the solid electrolytic capacitors V to X of Comparative Examples 10 to 12 were also measured in terms of capacitance and ESR in the same manner as above. The measurement results are shown in TABLE 6. Note that the values shown in TABLE 6 are relative values with reference to those of Comparative Example 10.

If comparison is made between the solid electrolytic capacitor P of Example 10 and the solid electrolytic capacitor V of Comparative Example 10, this shows that the solid electrolytic capacitor P of Example 10 in which a coupling agent layer was formed between the first and second conductive polymer layers according to the ninth aspect of the invention exhibited increased capacitance and reduced ESR. The reduce in ESR can be attributed to the fact that as compared to the coupling agent having a molecular structure containing a phosphonic acid group but not containing a conductive polymer monomer, the coupling agent having a molecular structure containing a conductive polymer monomer and a phosphonic acid group provides chemical bonding between both the conductive polymer layers to improve the adherence between them, thereby reducing the contact resistance. Furthermore, the increase in capacitance can be attributed to the fact that the second coupling agent layer repairs defects in the dielectric layer to increase the coverage with the second conductive polymer layer.

As is apparent from comparison with the solid electrolytic capacitor P of Example 10, the solid electrolytic capacitor Q of Example 11 further increases the capacitance and further reduces the ESR since according to the eighth aspect of the invention the first coupling agent layer 3 is formed between the dielectric layer 2 and the first conductive polymer layer 4 and the second coupling agent layer 8 is formed between the first and second conductive polymer layers 4 and 5.

In the solid electrolytic capacitor R of Example 12, high-electrical conductivity poly(3,4-ethylenedioxythiophene) was used for the conductive polymer layer instead of polypyrrole. It can be understood that the use of such a high-electrical conductivity conductive polymer for a conductive polymer layer can provide further reduction in ESR.

What is claimed is:

1. A solid electrolytic capacitor comprising:
   an anode made of a valve metal or an alloy thereof;
   a dielectric layer provided on the surface of the anode;
   a first coupling agent layer made of a coupling agent containing a phosphonic acid group, the first coupling agent layer being provided on the dielectric layer;
   a first conductive polymer layer provided on the first coupling agent layer; and
   a cathode layer provided on or above the first conductive polymer layer,
   wherein the coupling agent comprises a coupling agent having a molecular structure in which at least two phosphonic acid groups are bonded via an alkyl group.

2. The solid electrolytic capacitor according to claim 1, further comprising:
   a second coupling agent layer made of the coupling agent and provided on the first conductive polymer layer; and

TABLE 6

|  | Solid Electrolytic Capacitor P | Solid Electrolytic Capacitor Q | Solid Electrolytic Capacitor R | Solid Electrolytic Capacitor V | Solid Electrolytic Capacitor W | Solid Electrolytic Capacitor X |
|---|---|---|---|---|---|---|
| Capacitance | 1.04 | 1.07 | 1.68 | 1.00 | 1.04 | 1.04 |
| ESR | 0.96 | 0.92 | 0.90 | 1.00 | 0.98 | 0.96 | a second conductive polymer layer provided on the second coupling agent layer,
wherein the cathode layer is provided on or above the second conductive polymer layer.

3. The solid electrolytic capacitor according to claim 1, wherein the coupling agent is represented by the following general formula:

$$(OH)_2P(O)-[CH_2]_n-P(O)(OH)_2$$

wherein n represents an integer of 1 to 18 which is the number of carbon atoms.

4. The solid electrolytic capacitor according to claim 1, wherein the coupling agent is selected from the group consisting of methylenediphosphonic acid, 1,8-octanediphosphonic acid and (12-phosphonododecyl)phosphonic acid.

5. A solid electrolytic capacitor comprising:
an anode made of a valve metal or an alloy thereof;
a dielectric layer provided on the surface of the anode;
a first conductive polymer layer provided on the dielectric layer;
a coupling agent layer made of a coupling agent containing a phosphonic acid group, the coupling agent layer being provided on the first conductive polymer layer;
a second conductive polymer layer provided on the coupling agent layer; and
a cathode layer provided on or above the second conductive polymer layer,
wherein the coupling agent comprises a coupling agent having a molecular structure in which at least two phosphonic acid groups are bonded via an alkyl group.

6. The solid electrolytic capacitor according to claim 5, wherein the coupling agent is represented by the following general formula:

$$(OH)_2P(O)-[CH_2]_n-P(O)(OH)_2$$

wherein n represents an integer of 1 to 18 which is the number of carbon atoms.

7. The solid electrolytic capacitor according to claim 5, wherein the coupling agent is selected from the group consisting of methylenediphosphonic acid, 1,8-octanediphosphonic acid and (12-phosphonododecyl)phosphonic acid.

8. A solid electrolytic capacitor comprising:
an anode made of a valve metal or an alloy thereof;
a dielectric layer provided on the surface of the anode;
a first coupling agent layer made of a coupling agent containing a phosphonic acid group, the coupling agent layer being provided on the dielectric layer;
a first conductive polymer layer provided on the first coupling agent layer; and
a cathode layer provided on or above the first conductive polymer layer,
wherein the coupling agent comprises a coupling agent having a molecular structure in which a phosphonic acid group and a conductive polymer monomer are bonded via an alkyl group.

9. The solid electrolytic capacitor according to claim 8, wherein the coupling agent is represented by the following general formula:

(structure: 5-membered heterocycle with X heteroatom, bonded to $-[CH_2]_n-P(O)(OH)_2$)

wherein n represents an integer of 1 to 18 which is the number of carbon atoms, and
x represents nitrogen or sulfur.

10. The solid electrolytic capacitor according to claim 9, wherein in the coupling agent the alkyl group is bonded to the conductive polymer monomer at a position other than the 1-position of a heterocycle forming the conductive polymer monomer.

11. The solid electrolytic capacitor according to claim 8, wherein the coupling agent is represented by the following general formula:

(structure: thiophene with $-[CH_2]_n-P(O)(OH)_2$)

wherein n represents an integer of 1 to 18 which is the number of carbon atoms.

12. The solid electrolytic capacitor according to claim 8, wherein the coupling agent is represented by the following general formula:

(structure: pyrrole (NH) with $-[CH_2]_n-P(O)(OH)_2$)

wherein n represents an integer of 1 to 18 which is the number of carbon atoms.

13. The solid electrolytic capacitor according to claim 8, further comprising:
a second coupling agent layer made of the coupling agent and provided on the first conductive polymer layer; and
a second conductive polymer layer provided on the second coupling agent layer,
wherein the cathode layer is provided on or above the second conductive polymer layer.

14. A solid electrolytic capacitor comprising:
an anode made of a valve metal or an alloy thereof;
a dielectric layer provided on the surface of the anode;
a first conductive polymer layer provided on the dielectric layer;
a coupling agent layer made of a coupling agent containing a phosphonic acid group, the coupling agent layer being provided on the first conductive polymer layer;
a second conductive polymer layer provided on the coupling agent layer; and
a cathode layer provided on or above the second conductive polymer layer,
wherein the coupling agent comprises a coupling agent having a molecular structure in which a phosphonic acid group and a conductive polymer monomer are bonded via an alkyl group.

15. The solid electrolytic capacitor according to claim 14, wherein the coupling agent is represented by the following general formula:

(structure: 5-membered heterocycle with X heteroatom, bonded to $-[CH_2]_n-P(O)(OH)_2$)

wherein n represents an integer of 1 to 18 which is the number of carbon atoms, and x represents nitrogen or sulfur.

16. The solid electrolytic capacitor according to claim 15, wherein in the coupling agent the alkyl group is bonded to the conductive polymer monomer at a position other than the 1-position of a heterocycle forming the conductive polymer monomer.

17. The solid electrolytic capacitor according to claim 14, wherein the coupling agent is represented by the following general formula:

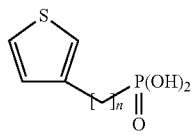

wherein n represents an integer of 1 to 18 which is the number of carbon atoms.

18. The solid electrolytic capacitor according to claim 14, wherein the coupling agent is represented by the following general formula:

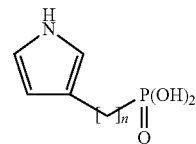

wherein n represents an integer of 1 to 18 which is the number of carbon atoms.

* * * * *